United States Patent [19]

Travis

[11] 4,114,141

[45] Sep. 12, 1978

[54] DIGITAL COMMUNICATION SYSTEM FOR TRANSMITTING DIGITAL INFORMATION BETWEEN A CENTRAL STATION AND A NUMBER OF REMOTE STATIONS

[75] Inventor: Brian A. Travis, Sea Bright, N.J.

[73] Assignee: Datrix Corporation, Westchester, N.Y.

[21] Appl. No.: 759,774

[22] Filed: Jan. 14, 1977

[51] Int. Cl.² .......................................... H04M 11/04
[52] U.S. Cl. ............................. 340/151; 340/147 SY; 340/168 B; 340/310 A; 325/58
[58] Field of Search ............ 340/151, 147 SY, 168 B, 340/310 R, 310 A; 325/58

[56] References Cited

U.S. PATENT DOCUMENTS

| | | | |
|---|---|---|---|
| 3,382,483 | 5/1968 | Brothman et al. | 340/151 |
| 3,447,085 | 5/1969 | De Haas et al. | 325/58 |
| 3,541,552 | 11/1970 | Carlson | 340/147 SY |
| 3,656,112 | 4/1972 | Paull | 340/151 |
| 3,684,964 | 8/1972 | Bright et al. | 340/147 SY |
| 3,688,271 | 8/1972 | Rouse | 340/151 |
| 3,967,264 | 6/1976 | Whyte | 340/310 A |
| 4,012,734 | 3/1977 | Jagoda et al. | 340/151 |

OTHER PUBLICATIONS

C. Clifford, "Six Decade Counter For Industrial Systems", New Electronics, vol. 8, No. 13, pp. 27, 30, Jun. 24, 1975.

*Primary Examiner*—Donald J. Yusko
*Attorney, Agent, or Firm*—Schuyler, Birch, Swindler, McKie & Beckett

[57] ABSTRACT

A communication system is disclosed for transmitting digital information between a central station and a large number of remote stations. Digital information is identified by the relationship between a simple pulse marking signal and a time reference signal which is common to all stations, that is, the time reference signal synchronizes the operation of all the stations. The relationship of the marking signal, which does not in itself carry any digital information, to the time reference signal is initially determined by the content of the digital information. Thus, this digital information can only be subsequently determined by evaluating the relationship between the marking signal and the time reference signal. In this communication system, digital radio wave transmission is used to transmit marking signals between stations and the power lines of a power distribution system are used as the source of the time reference signal. The marking signals transmitted by radio waves are used to start and stop digital counters located at each of the stations in the communication system. The operation of these digital counters is synchronized by the time reference signal transmitted over the power lines of the power distribution system. Since the relationship between the radio wave marking signals and the power line reference signal is identified by these digital counters, the digital information is transferred from one station to another and vice versa simply by the controlled operation of these digital counters. This communication system is primarily intended for use in a power distribution system for transmitting digital information from a plurality of remote stations each having a watt-hour meter associated therewith to a central station which uses this digital information for load management and control. The central station is capable of requesting a particular one of the plurality of remote stations to transmit digital information by actuating the digital counters in the manner described above. In response to the request from the central station, the particular remote station responds by transmitting the digital information contained therein to the central station which identifies the responding remote station.

62 Claims, 14 Drawing Figures

FIG.2 CENTRAL STATION

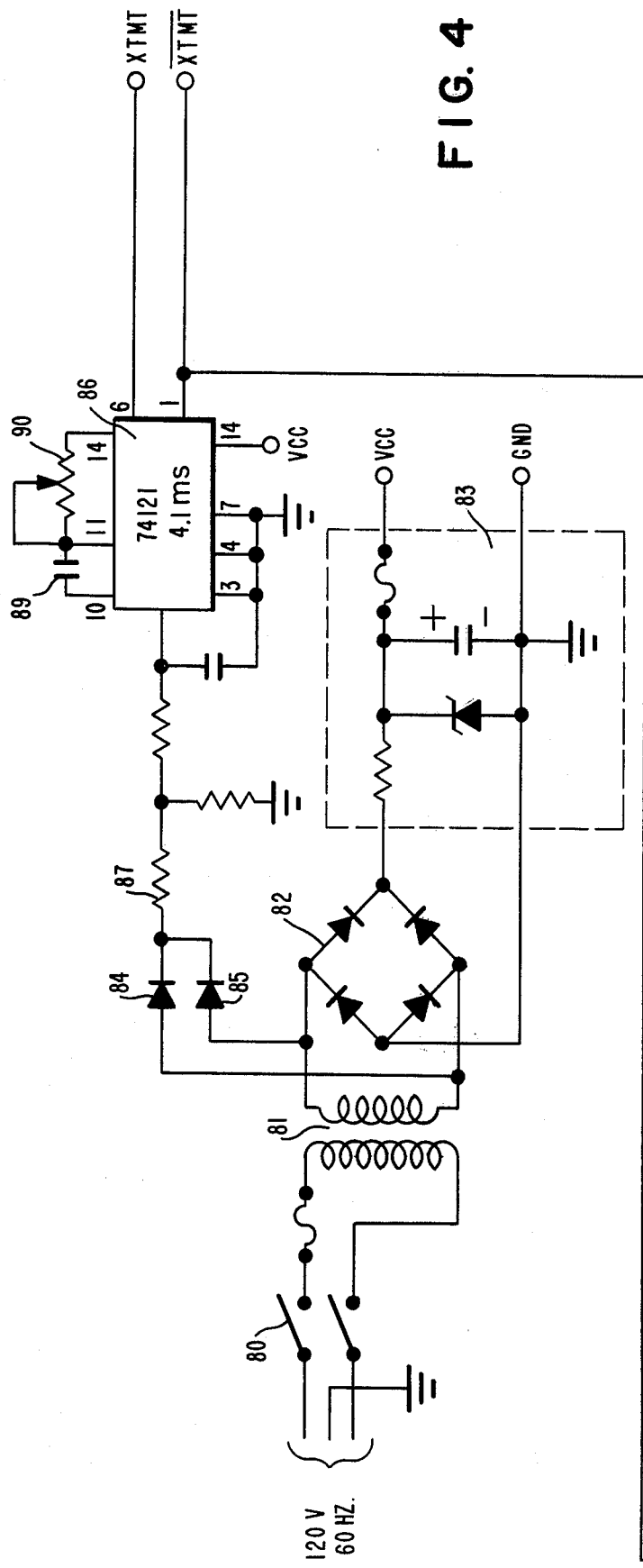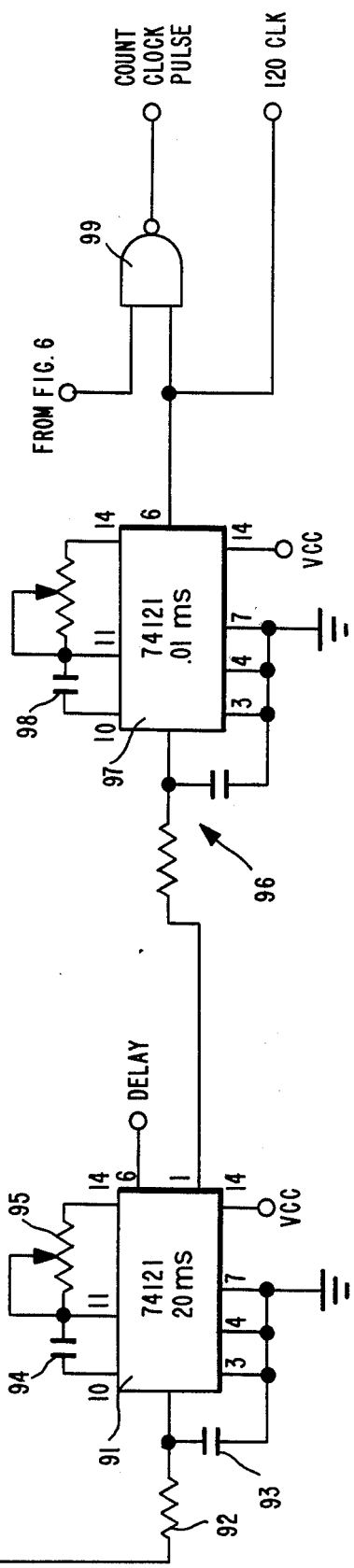
FIG. 4

REMOTE STATION
DIGITAL ENCODER

POWER SUPPLY
& TIMING SOURCE

FIG. 9 REMOTE STATION DIGITAL DECODER

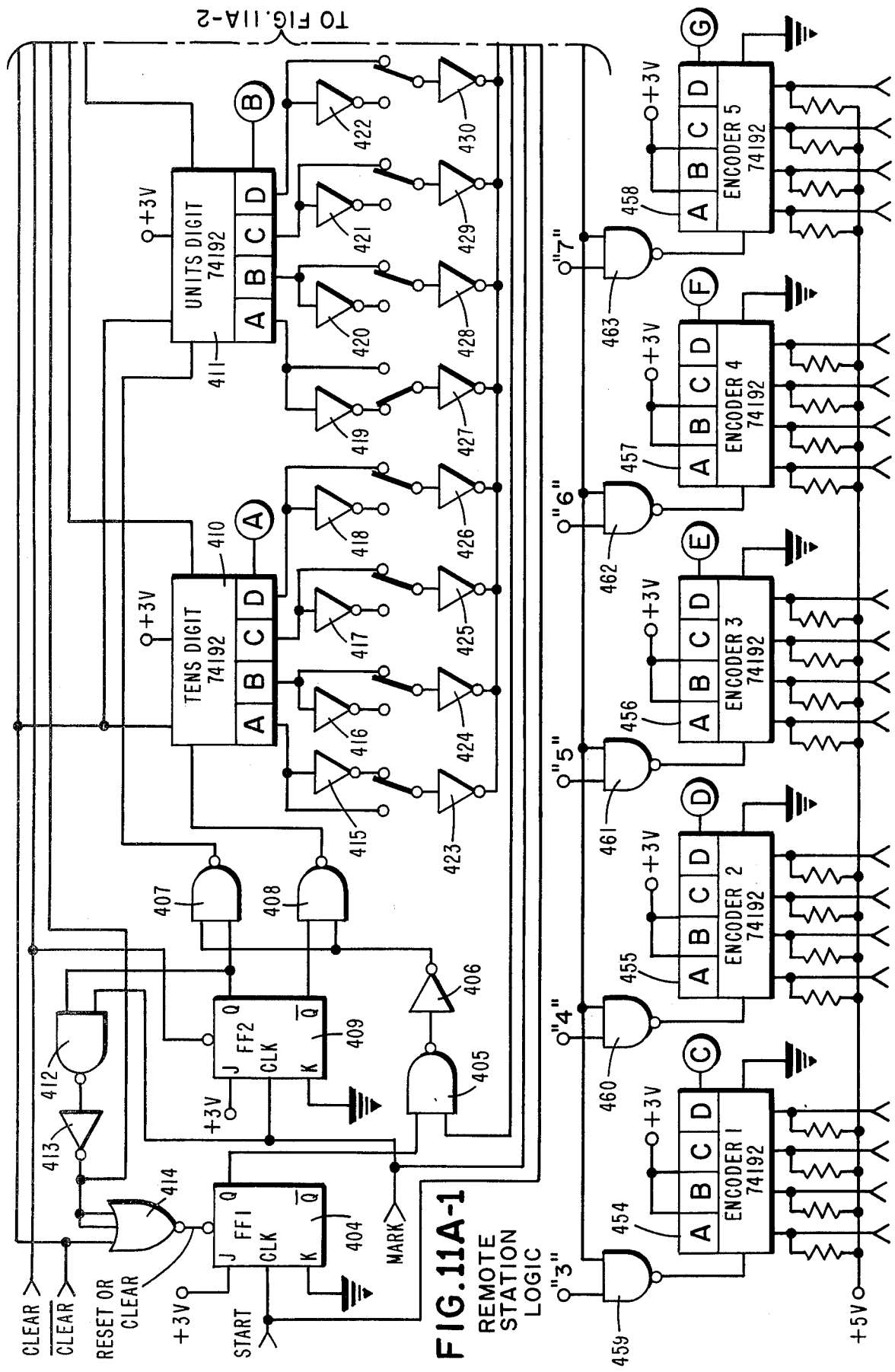
FIG.11A-1 REMOTE STATION LOGIC

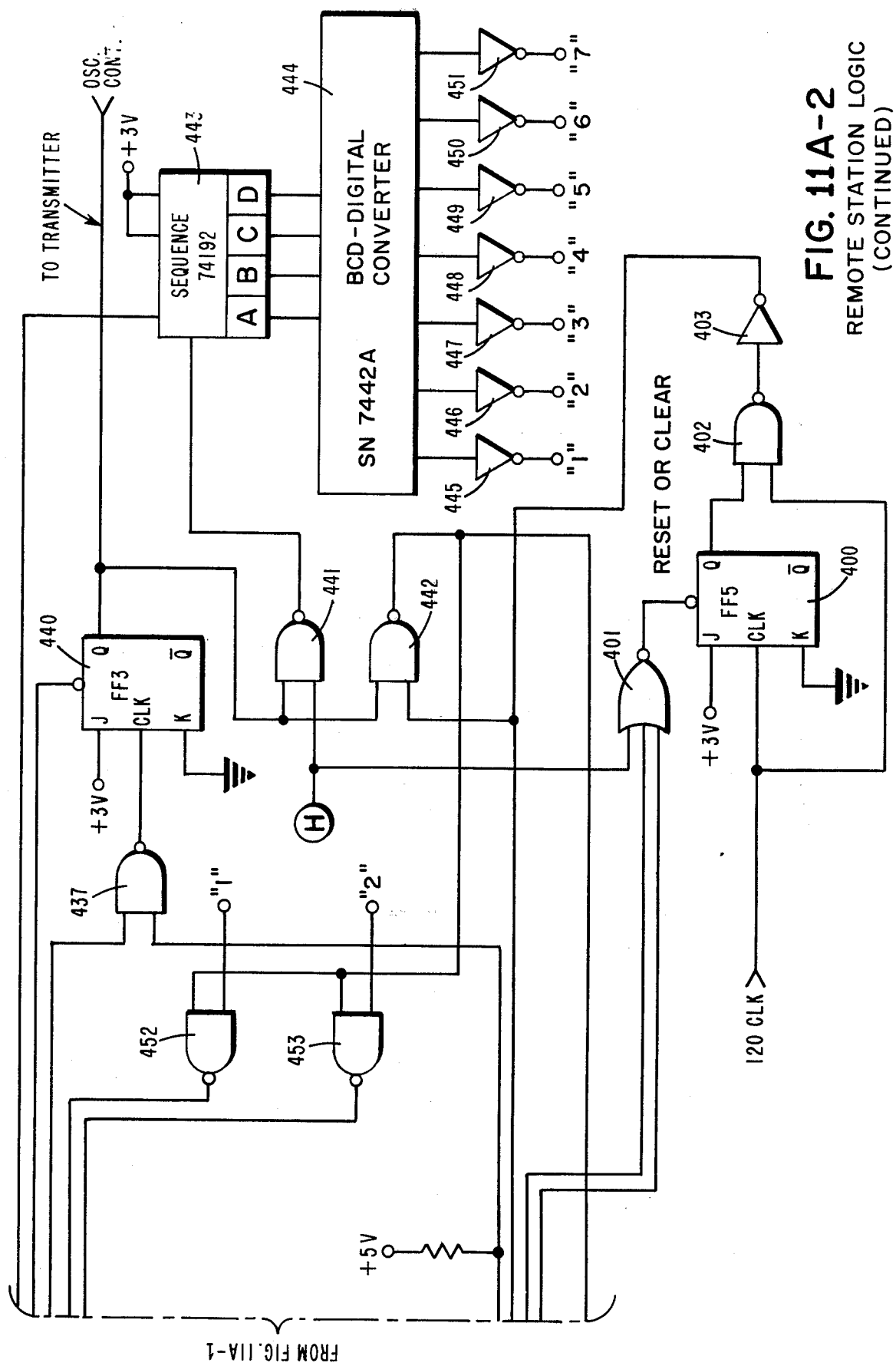
FIG. 11A-2 REMOTE STATION LOGIC (CONTINUED)

DIGITAL COMMUNICATION SYSTEM FOR TRANSMITTING DIGITAL INFORMATION BETWEEN A CENTRAL STATION AND A NUMBER OF REMOTE STATIONS

BACKGROUND OF THE INVENTION

The present invention is a communication system for transmitting digital information from station to station. In particular, the present invention is directed to a communication system for use in the control and management of a power distribution system which includes a plurality of remote stations and a central station. Each of the remote stations transmits digital information such as the digital readings of watt-hour meters located in each remote station to the central station. Digital information is transmitted between each of the remote stations and the central stations according to the present invention by stopping and starting digital counters located in each of the stations in response to radio wave signals transmitted from station to station. A reference signal is supplied to the digital counters in each of the remote stations and the central station over the power lines connected between the stations.

In present power distribution systems it is frequently necessary to collect digital information such as watt-hour readings from a plurality of remote stations for purposes of load management and control. Under present practice, this digital information is manually collected by sending a person to read the watt-hour meters at each remote station. This digital information is then used for management purposes including billing of customers. However, because of the difficulty and expense involved in collecting this digital information, it is not collected very frequently. As a result, the potential uses for this digital information in load management and control are not fully realized.

Various communication techniques are known in the art for transmitting digital information from station to station. For example, techniques are known for transmitting digital information over the 60 cycle power lines in a power distribution system. However, because these power lines have been primarily designed to transmit power at a low frequency with as little power loss as possible, the injection of any information signals into these power lines requires the use of a communication technique that can utilize a relatively low frequency signal. One example demonstrating the use of a relatively low frequency communication signal in power lines is the ripple control communication technique wherein an information signal of a frequency in the order of the second to fourth harmonic of the power signal in the power lines of the power distribution network is injected into the power lines. This information signal can be detected by receivers located at appropriate points throughout the power distribution network. Although this ripple control communication technique is extremely accurate and there is such a high probability of acceptance of the information signal by the remote stations that redundancy or two-way checking is unnecessary, the low frequency requirement dictated by the use of the power lines of the power distribution system prevent the ripple control technique from being useful for communicating on an individual basis with more than a few hundred distinct stations.

The transmission capacity of the ripple control communication technique is primarily determined by the amount of time required to recognize an information signal at the receiving station. The selectivity of the receiving station as well as the frequency of the information signal affect the response time of the receiving station. Response time is determined by the amount of time required for a filter in the receiving station to reach a given amplitude sufficient to identify the presence of the information signal to the exclusion of transient interference. Additional time delay is encountered because this information signal must be present at this given amplitude for a time period at least as long as the response time of the filter. Because frequency selection dictates the band width of the receiver filter, a highly selective filter at 400 hz might have a band width of approximately 6 hz whereas a highly selective filter at 154 Mhz might have a band width of 6 Khz. The response time of a 6 hz filter approximates 150 milliseconds while the response time of a 6 Khz filter approximates 150 microseconds. Thus, the higher the frequency the shorter the response time of the filter in the receiving station and the higher the data rate capacity or transmission capacity of the communication system. For this reason, the use of the power lines of the power distribution system as the transmission medium dictates a rather low transmission capacity as compared with other possible communication techniques.

The communication capacity of the ripple control communication technique is also limited. In order to make maximum use of any transmission medium, it is desirable to use the least possible number of bits in coding the data signals to obtain the largest possible number of commands. The relationship between the number of bits and number of commands is determined by the formula $C = 2^n$ where C is the number of commands and n is the number of bits. Combining this formula with the previously determined response time (150 milliseconds) of a low frequency selective filter for the ripple control communication technique will determine the theoretical constraints of the ripple control technique. Thus, a thousand different commands would require 10 bits at 150 milliseconds per bit for a theoretical signal time of 1.5 seconds. However, in applying practical constraints, we would probably find the practical minimum signal time to be at least 5 seconds. If such a communication technique is used for individual interrogation of a plurality of remote stations, even on a one-way basis it would take a month for the transmission of information signals to a population of only 250,000 units. The communication capacity of the ripple control communication technique is clearly limited to mass addressing and supervisory control. In addition, the communication capacity of the ripple control technique cannot be improved by use of multiplexing because the ripple control technique necessarily saturates the power lines of the entire power distribution system.

It is possible to use other communication techniques other than the ripple control communication technique which use the power lines of a power distribution system as a transmission medium. For example, communication techniques such as frequency shift keying and pulse code modulation can be used. These communication techniques permit the use of multiplexing and other techniques for data compression. As a result, concurrent transmission among groups of points located in different sections of the power distribution system can be accomplished. However, these other communication techniques are also relatively slow when employed over 60 cycle power lines as compared with their use in other transmission media. In addition, if geographical multiplexing or partitioning of the power distribution system is used, a method must be devised for gaining access to the different points in the power distribution system.

Another possible known communication technique which may be utilized for transmission of digital information from a plurality of remotely located watt-hour meters to a central station is telephone transmission. Telephone transmission permits the use of tone modulation and other sophisticated digital transmission techniques. However, for purposes of load management and control in a power distribution system involving a large number of customers, the present high cost as well as the future potential for large cost increases prohibits the use of telephone transmission.

Analog radio transmission offers the greatest flexibility in frequency selection and, as a result, many different communication techniques can be combined with analog radio transmission. In addition, radio transmission is the most inexpensive of the available transmission media. However, radio transmission suffers a serious drawback in that it is not possible to establish a dedicated path between one station and another station to the exclusion of all other radio transmissions. Although the Federal Communications Commission allocates frequencies for different purposes and issues licenses for the use of these allocated frequencies, in practice there is often both intentional and unintentional violation of these frequency allocations. In order to sufficiently protect the integrity of an analog radio transmission system, the cost of the equipment involved would be beyond that justified for a communication system for load management and control in a power distribution system.

Another available communication technique is digital radio transmission. The integrity of digital radio transmission is much easier to safeguard than analog radio transmission because the receiving stations in a digital radio system can be simply preconditioned to accept certain sequences of digital pulses. As a result, the cost of digital radio transmission is much less than analog radio transmission. One way or outbound digital radio communication techniques have been proven acceptable for the transmission of digital information. For example, either a limited number of commands can be sent to a large grouping of similarly coded remote stations or a small number of remote stations can be individually addressed. However, using present digital radio transmission techniques, information cannot be brought back from a large number of remote stations if each of these remote stations must be distinctly identified. Thus, with respect to the communication of digital information between a plurality of remote stations and a central station in a power distribution system, the problem lies not with with the transmission capabilities or economics of digital radio transmission, but with the requirement for a communication technique which is capable of identifying individual stations and then allowing an individual station to communicate its digital information back to the central station.

A number of interconnected transmission systems are known which use a combination of the above mentioned communication techniques for the purposes of bi-directional communication between a small number of remote stations and a central station. For example, the ripple control technique, frequency shift keying or pulse code modulation may be used for transmitting digital information from a small number of remote stations to a substation which is connected by a telephone link with a central station. Although such a combination may use pulse code modulation to advantage for data acquisition and then use telephone transmission to advantage for speed in data transmission, the same disadvantage mentioned above with respect to each of these communication techniques still are present in this interconnected transmission system. Similarly, other known interconnected transmission systems do not eliminate the disadvantages of each of the communication techniques contained therein because such interconnected transmission systems are merely a series connection of several different communication techniques.

It is an object of the present invention to optimize the advantages of different communication techniques and to combine these different communication techniques in a new communication system. The communication system of the present invention is a comprehensive system which uses the optimum features of several different communication techniques without being subject to the individual disadvantages of these communication techniques.

It is an object of the present invention to develop a bi-directional communication system for transmitting a large amount of digital information between a central station and a large number of remote stations on an individual basis. The communication system of the present invention transmits this digital information at high speed while at the same time having the advantages of reliability, accuracy and low cost.

It is a further object of the present invention to develop a communication system which can be effectively used for load management and control in a power distribution system. In particular, it is an object of the communication system of the present invention to transmit digital information from a large number of remote stations in a power distribution system such as the watt-hour meters at customer locations to a central station for use in load management and control.

Another object of the present invention is to provide a digital communication system which protects data integrity by providing a high level of security. In particular, it is an object of the present invention to provide a communication system designed with a series of checks such that even minor interferences will prevent the completion of data transmission rather than allow incorrect data to be transmitted. Furthermore, the communication system of the present invention operates at high speed, a non-response followed by a reinterrogation is preferred rather than complicating the transmitted digital information with a combination of error detecting and error correcting codes.

SUMMARY OF THE INVENTION

This invention is a communication system for transferring digital information between a plurality of remote stations and a central station. This communication system is primarily intended for use in a power distribution system for transmitting digital information from a plurality of remote watt-hour meters located at residences and other locations to a central station which utilizes this digital information for load management and control. Each of the remote stations in this communication system is queried by the central station and responds to the central station with the requested digital information. Data acquisition is initiated by the transmission of a command from the central station which specifies one of the plurality of remote stations. The command is received and validated by the specific one of the remote stations which then transmits a response which includes the identification of the responding remote station and the requested digital information. The response sent by the specific one of the remote stations is finally received and validated by the central station which then processes the digital information received for purposes of load management and control. For example, using this communication system, the central station can automatically read a large number of remotely located watt-hour meters and gather data at practically any given time interval which is preselected. Because the communication system of the present invention enables the central station to accurately monitor power usage throughout the power distribution system, various other management uses can be made of this digital information.

The communication system of the present invention is a new communication system which combines two different signals in a single communication system for transmitting digital information. Digital radio transmission is used as the primary data transmission technique in order to take advantage of its reliability, speed and low cost. In order to overcome the limited data handling capability of digital radio transmission, the communication system of the present invention also utilizes in combination therewith a reference signal transmitted over the 60 cycle power lines of the power distribution system which connect the central station with each of the plurality of remote stations. Thus, the communication system of the present invention utilizes the accuracy and reliability of the 60 cycle power line for providing a reference signal together with the high speed and economy of digital radio transmission.

According to the present invention, digital counters are located at each of the stations in the communication system. The operation of these digital counters is synchronized by the reference signal transmitted over the 60 cycle power lines of the power distribution system. For example, the digital counters located in a particular remote station may comprise a plurality of down counters while the digital counters located in the central station may comprise a plurality of up counters. If it is desired to transmit digital information contained in the digital down counters located in the remote station to the digital up counters located in the central station, then the first of the plurality of up counters located in the central station is stepped in synchronism with the reference signal transmitted over the 60 cycle power lines of the power distribution system. As the first down counter located in the particular remote station reaches the value zero, a stop signal is transmitted by radio wave transmission to the central station to stop the counting of the first up counter located in the central station. This stop signal also is used to start the second down counter in the remote station and the second up counter in the central station. The remaining down counters in the remote station and the remaining up counters in the central station are actuated in succession in a similar manner. After the last down counter in the remote station reaches zero and transmits a stop signal by radio wave transmission to the central station, the digits located in the up counters in the central station are equivalent to the digits previously located in the down counters in the remote station. This technique for communicating digital information from a particular remote station to a central station does not require the radio wave transmission of complex signals, because these signals do not in themselves contain the requested digital information. The requested digital information can only be gathered by the central station by combining the reference signal transmitted over the 60 cycle power lines with the start and stop signals or the marking signal transmitted by radio waves.

Additional digital counters can be located in the central station and each of the plurality of remote stations for transmitting the digital address of a specific remote station. The communication system of the present invention enables the central station to request a specific remote station to transmit digital information by sending an address signal to the plurality of remote stations in the same manner as described above. The plurality of remote stations then can compare the transmitted address signal with a preassigned address to determine which remote station is the requested remote station. In other words, a plurality of counters located in both the central station and each of the plurality of remote stations can be used for transmitting the digital address of a particular remote station. Similarly, any response transmitted by the requested remote station to the central station can contain the digital address of the requested remote station. This digital address is also transmitted in the same manner as described above. Then, upon receiving digital information, the central station can identify the address of the responding remote station.

The communication system of the present invention provides for a number of security checks on the transfer of digital information from station to station. For example, because the start and stop marking signals transmitted by radio wave transmission do not in themselves contain the requested digital information, these start and stop marking signals can be uniquely coded to provide security against interference by outside digital radio signals. This can be accomplished by assigning a designated pulse code to each of the signals transmitted between stations by radio wave transmission, including the start, stop and address marking signals. In addition, these marking signals can be matched at each station for coincidence with the reference signal transmitted over the 60 cycle power lines of the power distribution system. In this manner, the communication system of the present invention provides a large number of security checks for each signal transmission. The failure or nonacceptance of any one of these security checks during any signal transmission will immediately stop the transmission and thereby require a reinterrogation.

BRIEF DESCRIPTIONS OF THE DRAWINGS

FIG. 4 is a circuit diagram of the power supply and timing source of the central station shown in FIG. 2.

FIG. 11A (comprised of 11A-1 and 11A-2) shows a circuit diagram of the remote address identifier logic circuit and the remote response logic circuit of the remote station shown in FIG. 3.

DETAILED DESCRIPTION OF THE INVENTION

Figure 1:
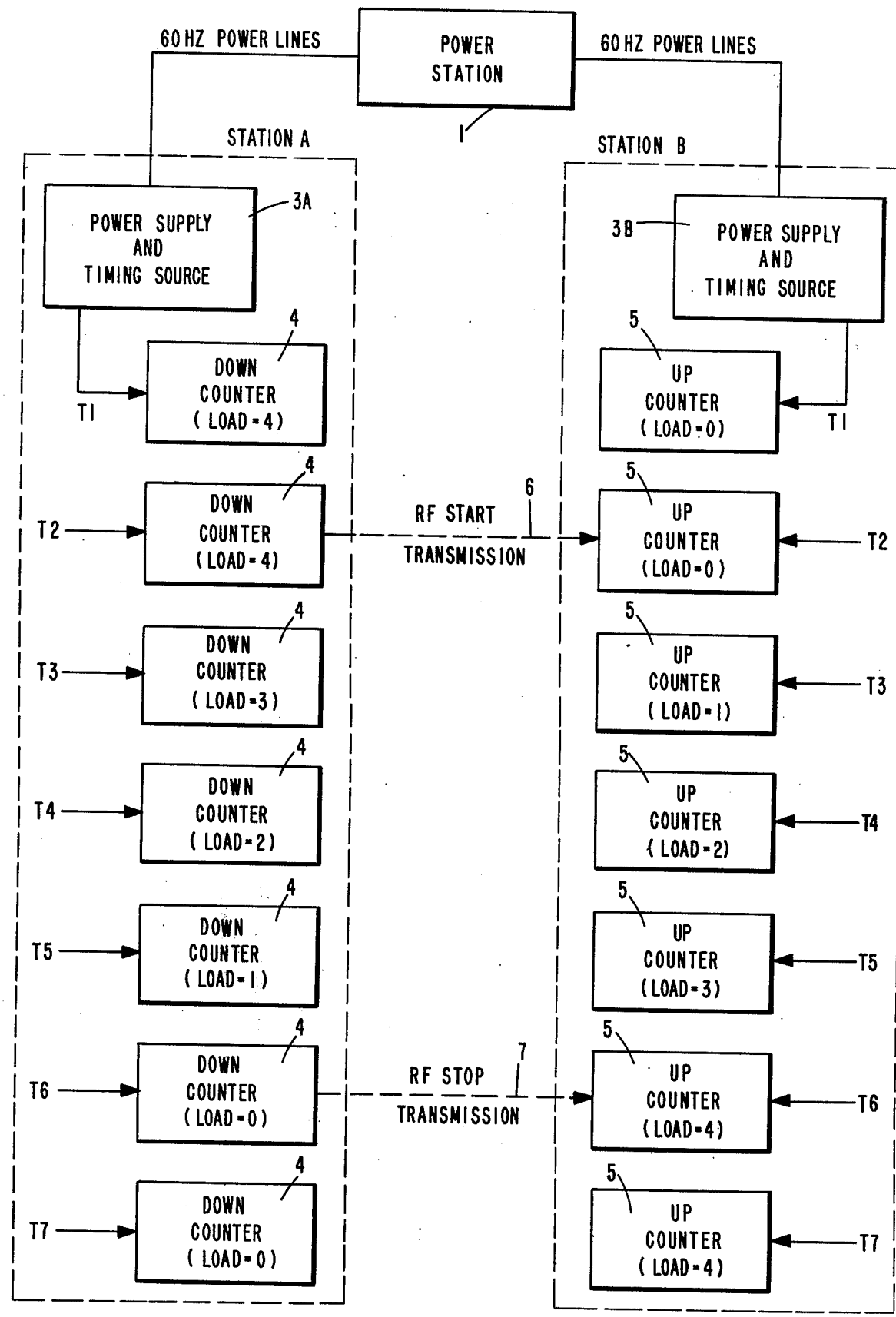
FIG. 1 is a combination block and timing diagram illustrating the basic concept for transferring digital information according to the present invention.

The combination block and timing diagram shown in FIG. 1 illustrates the basic concept of the communication system of the present invention. A power station 1 is connected to station A over 60 hz power lines 2A and to station B over 60 hz power lines 2B. The power lines 2A are connected to a power supply and timing source 3A in station A and the power lines 2B are connected to a power supply and timing source 3B in station B. The 60 hz signal transmitted over the power lines 2A and 2B is used as a reference signal in stations A and B. The power supply and timing sources 3A and 3B generate timing or synchronizing signals T1-T7 which are supplied to the down counter 4 in station A and the up counter 5 in station B. As shown in FIG. 1, the down counter 4 initially stores the digit 4 and the up counter 5 initially stores the digit 0. A preselected start marking signal is generated in station A to start the down counter 4 upon the occurrence of timing signal T2. A radio frequency start marking signal 6 transmits this start marking signal from the down counter 4 in station A to the up counter 5 in station B. In this manner, the up counter 5 in station B starts counting at relatively the same time as the down counter 4 in station A starts counting. Both the down counter 4 and the up counter 5 step through their counting positions in synchronization with the timing signals T1-T7 provided by the power supply and timing sources 3A and 3B, respectively. As shown in FIG. 1, the down counter 4 counts down from the digit 4 to the digit 0 during timing signals T2-T6 while the up counter 5 counts up from the digit 0 to the digit 4 during the occurrence of the same timing signals. No further interaction between station A and station B is required after the transmission of the RF start marking signal 6 until the down counter 4 of station A reaches the digit 0. At this time, an RF stop marking signal 7 is transmitted from the down counter 4 in station A to the up counter 5 in station B. This stops the up counting of the up counter 5 at station B and locks in the digit whose value corresponds to the numerical value of the number of timing signals between the end of the RF start marking signal 6 and the RF stop marking signal 7. In the example shown in FIG. 1, the digit 4 which is initially stored in the down counter 4 is transferred to the up counter 5. This digit is stored in the up counter 5 as shown by timing signal T7.

The example shown in FIG. 1 illustrates the method of transferring digital information from one station to another station by synchronizing digital counters located in both stations with a reference signal transmitted between stations while at the same time providing an independent marking signal to control the actuation of these digital counters. In this example, the independent marking signal is transmitted between stations as a radio frequency signal. However, other different signal transmitting methods may be used to accomplish the same purpose. For example, the marking signal can be transmitted over power lines, telephone lines, or can be sent by radio waves as shown in FIG. 1. On the other hand, the reference signal of the invention as shown in FIG. 1 generally is transmitted between stations A and B over the 60 hz power lines of a power distribution system. These power lines are used for transmission of the reference signal because the signal transmitted over these power lines can be used to generate a highly accurate and reliable reference. In practice, stations A and B in FIG. 1 each contain a series of down counters and up counters for transmitting any desired quantity of digital information between these stations.

In the preferred embodiment of the communication method, digital information is transmitted between a plurality of remote stations and a central station. The central station of the present invention is shown in block diagram in FIG. 2 and one of the plurality of remote stations is shown in block diagram in FIG. 3. When used in a power distribution system, these remote stations are used to monitor the power usage at various locations throughout the power distribution system. When used in this manner, the central station shown in FIG. 2 may be one of several sub-stations in the power distribution system which is responsible for a designated number of remote stations.

Figure 2:
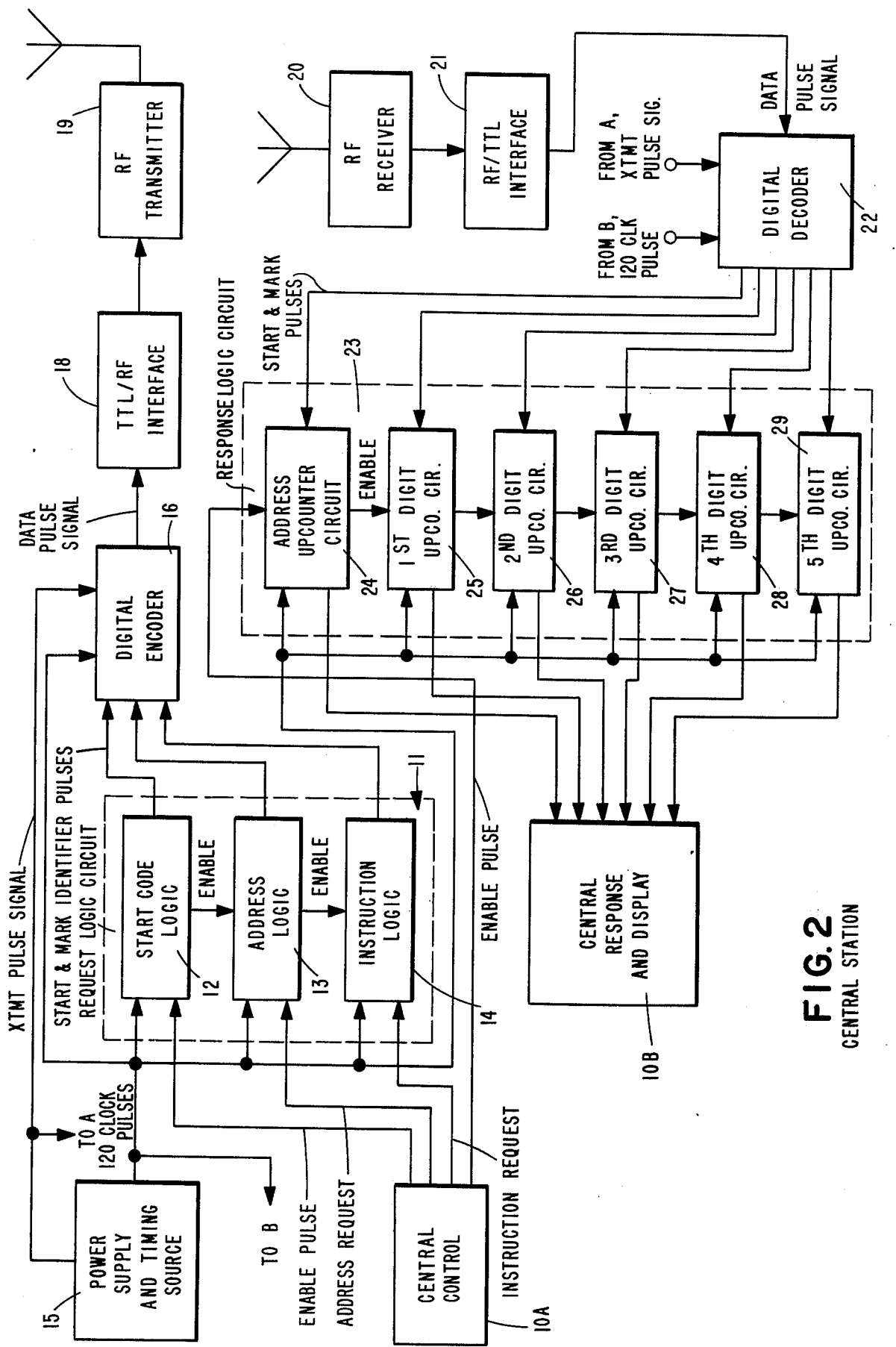
FIG. 2 is a block diagram of the central station of the communication system of the present invention.

The operation of the central station shown in FIG. 2 is controlled by a central control 10A which generates request signals for requesting digital information from one of the plurality of remote stations. This central control 10A may be a central computer processor or in its simplest form it may be a plurality of manually controlled switches which generate the request signals. The central control 10A which is connected to the request logic circuit 11 supplies request signals to the request logic circuit 11.

The request logic circuit 11 includes two basic circuits and an optional third circuit. The two basic circuits are the start code logic circuit 12 and the address logic circuit 13. The instruction logic circuit 14 shown in FIG. 2 is an optional circuit which is not necessary to the basic operation of the communication system of the present invention. The instruction logic circuit 14, when included in the request logic circuit 11, enables the communication system of the present invention to transmit an instruction code to the remote stations which enables the remote stations to perform one of several different possible functions. In the preferred embodiment this instruction logic circuit 14 can be dispensed with since the remote stations perform only one function or instruction. These logic circuits in the request logic circuit 11 are triggered by a 120 clock pulse provided by the power supply and timing source 15. This power supply and timing source 15 is described in further detail below with reference to FIGS. 4 and 5. The operation of the start code logic circuit 12 is initiated by an enable pulse provided by the central control 10A. In response to this enable pulse, a coded start signal (start identifier pulses) is generated by the start code logic circuit 12. In addition, the start code logic circuit 12 provides an enable pulse to the address logic circuit 13 which receives an address request from the central control 10. The address logic circuit 13 generates an address signal (mark identifier pulses) and also provides an enable pulse to the instruction logic circuit 14. The instruction logic circuit 14 receives an instruction request from the central control 10A and generates an instruction signal (mark identifier pulse) which, together with the start signal and the address signal, are supplied as start and mark identifier pulses to the digital encoder 16.

Figure 3:
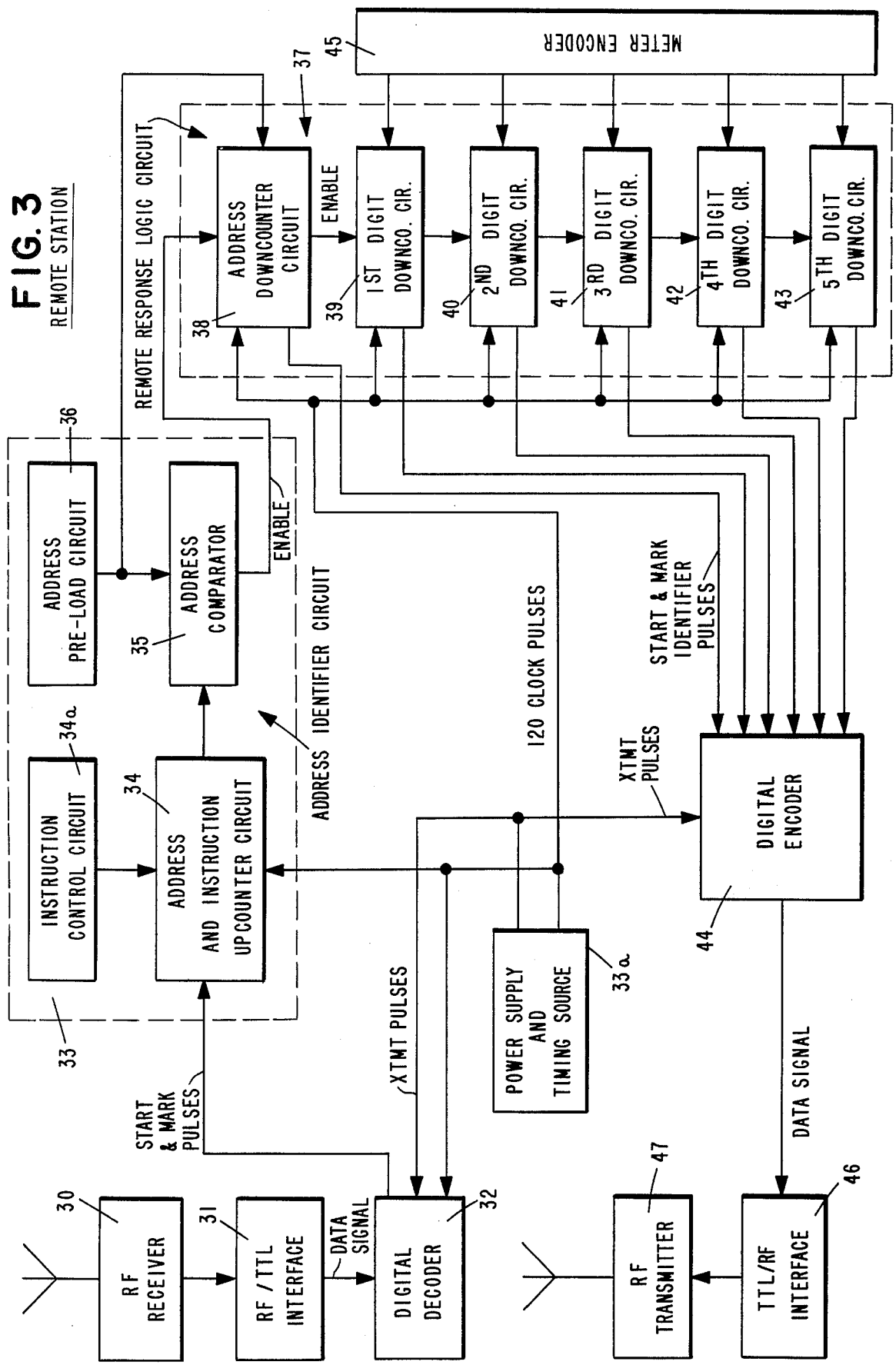
FIG. 3 is a block diagram of one of the remote stations of the communication system of the present invention.

The digital encoder 16 receives the start and mark identifier pulses from the request logic circuit 11 and converts these identifier pulses into a coded data pulse signal for transmission to the remote stations shown in FIG. 3. Since according to the present invention the pulses of the marking pulse signal do not in themselves contain the digital information transmitted by the central station to the remote stations, each of these pulses can be pulse coded by the digital encoder 16 to ensure signal security. The pulse coding of each of these pulses by the digital encoder 16 is accomplished in the same manner as the pulse coding of the pulses of the data pulse signal generated by the remote station shown in FIG. 11B. The digital encoder 16 receives the 120 clock pulse from the power supply and timing source 15 as well as an XTMT (transmit) pulse signal which is also generated by the power supply and timing source 15. The XTMT pulse signal generated by the power supply and timing source 15 is derived from the 60 hz frequency of the power distribution system. The central station and the remote stations of the present invention are connected together by these power lines in the power distribution system. The generation of this XTMT pulse signal by the power supply and timing source 15 is described in greater detail below in connection with FIGS. 4-5 (central station) and FIG. 8 (remote station). Each start and mark identifier pulse received by the digital encoder 16 from the request logic circuit 11 is synchronized with a XTMT pulse of the XTMT pulse signal from the power supply and timing source 15. At the proper time, the digital encoder 16 generates the proper marking pulses which are supplied to the TTL/RF interface 18 for generation of corresponding radio frequency signals to be transmitted to the remote stations by the RF transmitter 19. The start and mark identifier pulses which are used by the digital encoder 16 to generate these marking pulses identify the number of periods, that is, the number of 120 clock pulses, between each of the identifier pulses generated by the request logic circuit 11. For example, the number of periods (120 clock pulses) between the start pulse and the first mark pulse indicates the numeric value of one of the digits of the address selected by the central control 10 and processed by the address logic circuit 13. Then, the number of periods (120 clock pulses) between this first mark pulse and the second mark pulse indicates the numeric value of another of the digits of the selected address. In this manner, the numeric values of all of the digits of the selected address as well as the numeric value of the digit or digits of the selected instruction are indicated by the number of periods (120 clock pulses) between the start pulse and the subsequent mark pulses generated by the request logic circuit.

The TTL/RF interface 18 and the RF transmitter 19 used in the present invention are of known construction. The RF signal transmitted by the RF transmitter 19 is modulated in accordance with the marking pulse signal generated by the digital encoder 16. The frequency band of the RF transmitter 19 is a matter of design choice. For example, one transmitter for use with the present invention employs a 27 Mhz crystal oscillator for generating the carrier frequency of the RF transmitter 19. Of course, other carrier frequencies may be selected. The modulation technique used in this RF transmitter 19 may be, for example, on/off keying which is controlled by the TTL/RF interface 18. Many different modifications of the RF transmitter 19 and the TTL/RF interface 18 may be employed in this invention without departing from the scope of this invention.

The RF receiver 20 of the central station shown in FIG. 2 receives RF modulated signals from one of the plurality of remote stations and supplies RF indentifier signals to the RF/TTL interface 21. The RF receiver 20 and the RF/TTL interface 21, like the RF transmitter 19 and the TTL/RF interface 18, are both of known construction and need not be described in detail herein. The RF receiver 20 includes known components such as an RF amplifier, a local oscillator, a mixer amplifier, an IF amplifier and demodulator connected together in a known manner. The RF/TTL interface converts the RF output of the RF receiver 20 to a marking pulse signal in a known manner and supplies this marking pulse signal to the digital decoder 22.

The digital decoder 22 converts the incoming marking pulse signal into a series of identifier pulses (start and mark pulses) supplied to the response logic circuit 23. The power supply and timing source 15 supplies XTMT pulse signal and a 120 clock pulse to the digital decoder 22 for enabling the digital decoder 22 to identify the incoming marking pulse signal. Each of the pulses in the marking pulse signal are pulse coded by the remote station prior to transmission to the RF receiver 20 in a manner similar to the pulse coding of the start and mark pulses generated by the digital encoder 16. The digital decoder 22 includes a decoding circuit for decoding the pulse code of each of these pulses in the data pulse signal. This decoding circuit is similar to the decoding circuit for the remote station shown in FIG. 9 except that the digital decoder 22 in the central station only includes the clear pulse circuit (elements 301 and 302), the framing pulse circuit (elements 300, 303–306) and the matching circuit (elements 307–311), the output of the matching circuit being used as the start and mark pulse output of the digital decoder of the central station. The XTMT pulse signal from the power supply and timing source 15 permits the digital decoder 22 to determine whether the pulses in the incoming marking pulse signal are coincident with one of the pulses of the XTMT pulse signal. Additional coding checks are performed by the digital decoder 22 by comparing the XTMT pulse signal and the 120 clock pulse to the incoming marking pulse signal. In this manner, the digital decoder 22 as well as the digital encoder 16 provide signal security for the communication system of the present invention.

The start and mark pulses generated by the digital decoder 22 are supplied to the response logic circuit 23 which includes a plurality of up counter circuits for storing the digital information transmitted by one of the remote stations. These up counter circuits include an address up counter circuit 24 which stores the address of the responding remote station. The address up counter circuit 24 as well as all the other up counter circuits of the response logic circuit 23 count in synchronization with the 120 clock pulse provided by the power supply and timing source 15. An enable pulse is also supplied to the address up counter circuit 24 by the central control 10 after the generation of a request signal by the request logic circuit 11. The start and mark pulses supplied to the response logic circuit 23 by the digital decoder 22 are used by the address up counter circuit 24 as well as the other up counter circuits in the response logic circuit 23 for stopping the operation of digital up counters located in each of these up counter circuits. Digital information from a particular remote station whose address is stored in the address up counter circuit 24 is stored in the digit up counter circuits 25–29 in the response logic circuit 23. These up counter circuits 25–29 function in a manner similar to the operation of the address up counter circuit 24. The enable pulse for the first digit up counter circuit 25 is supplied by the address up counter circuit 24 after the last digital up counter in the address up counter circuit 24 stops counting. The enable pulses for each of the digit up counter circuits 26–29 are supplied in a similar manner. The outputs of the up counter circuits 24–29 of the response logic circuit 23 are connected to the central response 30 which may include a visual display of the digital information contained in the up counter circuits 24–29 or part of the central computer processor of the central control 10 previously described.

One of the remote stations of the communication system of the present invention is shown in FIG. 3. The RF receiver 30 receives the RF request signals generated by the RF transmitter 19 of the central station shown in FIG. 2. An RF identifier signal is provided to the RF/TTL interface 31 by the RF receiver 30. The RF receiver 30 and the RF/TTL interface 31 are, like the similar circuit components in the central station shown in FIG. 2, constructed in a known manner and therefore need not be described in detail herein.

The RF request signals, upon being received by the RF receiver 30 and converted into a marking pulse signal by the RF/TTL interface, are decoded in the digital decoder 32 in the remote station. This digital decoder 32, which functions in a manner similar to the digital decoder 22 in the central station, is shown in greater detail in FIG. 9 and described below. An XTMT pulse signal and a 120 clock pulse are derived from a power supply and timing source 33 for enabling the digital decoder 32 to determine whether each of the marking pulses of the data pulse signal received by the remote station are properly pulse coded. As mentioned previously, the pulse coding of each of these marking pulses ensures signal security. Start and mark pulses then are supplied by the digital decoder 32 to the remote address identifier logic circuit 33 which stores the address and instruction transmitted by the central station and determines whether the address received is the same as the preassigned address of the remote station.

The remote address identifier logic circuit 33 includes an address and instruction up counter circuit 34 which receives the start and mark pulses from the digital decoder 32 and stores the address and instruction corresponding to the start and mark pulses. An instruction control circuit 34a which is connected to the address and instruction up counter circuit 34 is an optional feature of the present invention. As stated previously, in the preferred embodiment of the present invention the remote station performs only one function and, as a result, the instruction control circuit and the instruction portion of the address and instruction up counter circuit can be eliminated. The address up counter circuit 34, which also is connected to receive the 120 clock pulse of the power supply and timing source 33, includes a plurality of digital up counters. These digital up counters count the number of periods (120 clock pulses) occurring between the start and mark pulses supplied by the digital decoder 32. The address stored in the address up counter circuit 34 is then compared in address comparator 35 with a preassigned address supplied to the address comparator 35 by an address preload circuit 36. If the preassigned address in the address preload circuit 36 matches the address stored in the address up counter circuit 34, the address comparator 35 supplies an enable pulse to the remote response logic circuit 37.

The remote response logic circuit 37 includes an address down counter circuit 38 and a plurality of digit down counter circuits 39–43. The address down counter circuit 38 also is connected to the address preload circuit 36. The address down counter circuit 38 down counts from the preassigned address of the remote station in synchronization with the 120 clock pulse supplied by the power supply and timing source 33. Start and mark identifier pulses are supplied by the address down counter circuit 38 to the digital encoder 44. Each of these identifier pulses indicates the number of periods (120 clock pulses) required by each of the digital up counters in the address down counter circuit 38 to down count to zero. The down counter circuits 39–43 of the remote response logic circuit 37 are connected to the meter encoder 45. The meter encoder 45 supplies digital information to the digit down counter circuits 39–43 from the watt-hour meter located at this particular remote station. Since the construction of the meter encoder 45 is known in the art and does not form part of the present invention, no further details need be described herein. For example the meter encoder 45 may be a presently available fiber optic encoder. This meter reading is stored in digital down counters located in each of the digit down counter circuits 39–43 which supply mark identifier pulses respresenting this digital information to the digital encoder 44. The first digit down counter circuit 39 is enabled by an enable pulse supplied by the address down counter circuit 38. The remaining digit down counter circuits 40–43 are then enabled in succession in a similar manner. The mark identifier pulses supplied by the remote response logic circuit 37 to the digital encoder 44 indicate the number of periods (120 clock pulses) required to down count to zero each of the digital counters located in the down counter circuits 38–43.

The digital encoder 44 in the remote station functions in a manner similar to the digital encoder 16 in the central station. The XTMT pulse signal from the power supply and timing source 33 is supplied to the digital encoder 44 to enable the digital encoder 44 to generate marking pulses in the marking pulse signal at the proper time. In addition, the digital encoder uses the XTMT pulse signal to pulse code each of the marking pulses of the marking pulse signal to ensure signal security. The circuit arrangement for the digital encoder 44 is shown in further detail in FIG. 11B and described below.

The marking pulse signal generated by the digital encoder 44 is supplied to the TTL/RF interface 46 and the RF transmitter 47 for transmission to the central station shown in FIG. 2. The TTL/RF interface 46 and the RF transmitter 47 are similar to the TTL/RF interface 18 and the RF transmitter 19 of the central station and, as such, are of known construction and need not be described in further detail herein.

The operation of the central station shown in FIG. 2 and the remote station shown in FIG. 3 is now described. When the central control 10 in FIG. 2 is activated to send a request to a particular remote station, the distinct address of that remote station is forwarded to the address logic circuit 13 of the request logic circuit 11. For example, if the system is designed to handle a three digit address, the address logic circuit 13 includes three digital down counters, one of which is assigned to the hundreds digit, another of which is assigned to the tens digit, and the third of which is assigned to the units digit. The hundreds digit, the tens digit and the units digit are supplied to each of these respective digital down counters. An optional instruction digit also is forwarded to the instruction logic circuit 14 of the request logic circuit 11. This instruction digit represents the instruction command for the particular remote station addressed by the central control 10. When these required steps have been completed, the central control 10 activates the enable pulse input of the start code logic circuit 12 of the request logic circuit 11. The start code logic circuit 12 then releases one or more sequential start identifier pulses to the digital encoder 16. The generation of the last of these start identifier pulses by the start code logic circuit 12 automatically enables the address logic circuit 13. Again, assuming a three digit address, the hundreds digit down counter is first enabled and will down count in synchronization with the 120 clock pulse from the numerical value of the digit loaded therein by the central control 10 to the numerical value zero, at which point it will send a mark identifier pulse to the digital encoder 16. Upon reaching zero, the hundreds digit down counter in the address logic circuit 13 will enable the tens digit down counter. The tens digit down counter will down count in synchronization with the 120 clock pulse from the numerical value of the digit loaded therein by the central control 10 to the numerical value zero, at which point it will also send a mark identifier pulse to the digital encoder 16. Upon reaching zero, the tens digit down counter will enable the units digit down counter which will then proceed to down count in synchronization with the 120 clock pulse in the same manner as described above. When the units digit down counter reaches zero, a mark identifier pulse is sent to the digital encoder 16 and an enable pulse is supplied to the optional instruction logic circuit 14. Again, the down counter or counters in the instruction logic circuit 14 down count in the same manner. Upon reaching zero, mark identifier pulses are sent to the digital encoder 16 corresponding to the down count of the instruction down counter or counters.

Each identifier pulse received by the digital encoder 16 is synchronized with a XTMT pulse of the XTMT pulse signal derived from the power supply and timing source 15 connected to the power distribution system. This XTMT pulse signal acts as a reference signal for the communication system of the present invention. At the proper time, the digital encoder 16 excites the RF transmitter thereby sending a marking pulse signal representing the start and mark pulses to the RF transmitter 19. These start and mark pulses identify the number of periods (120 clock pulses) between each of the identifier pulses supplied by the request logic circuit 11. The number of periods (120 clock pulses) between the last start pulse supplied by the request logic circuit 11 and the first identifier pulse supplied thereby indicates the numeric value of the hundreds digit; the number of periods between the first identifier pulse and the second identifier pulse indicates the numeric value of the tens digit; and the number of periods between the second identifier pulse and the third identifier pulse indicates the numeric value of the units digit of the remote station being interrogated. Finally, the number of periods between the third identifier pulse and the fourth identifier pulse indicates the numeric value of the instruction digit for the particular remote station. Hence, an entire population of remote stations is alerted by the start code generated by the start code logic circuit 12. A particular member of that population then is identified by the address code of the address logic circuit 13 and one of many possible instructions is sent to that particular remote station by the instruction logic circuit 14. The marking pulse signal representing these start and mark pulses generated by the digital encoder 16 is transmitted by the RF transmitter 19 as a modulated RF signal.

The signal transmitted by the RF transmitter 19 in the central station is received by the RF receiver 30 in the remote station which supplies a marking pulse signal to the digital decoder 32. The digital decoder 32 determines whether each of the marking pulses of the data pulse signal matches the time period of a XTMT pulse of XTMT pulse signal and also whether each of these data pulses is properly pulse coded. If these conditions are satisfied, the marking pulses are accepted by the digital decoder 32. If the requisite number of start identifier pulses is received by the remote station and sequentially accepted by the digital decoder 32, then this group of start identifier pulses is accepted as a legitimate start code. The acceptance of this start code immediately enables the address up counter circuit 34 in the address identifier logic circuit 33. Again, assuming a three digit address is transmitted by the central station, the hundreds digit up counter of the address up counter circuit 34 first is enabled. This up counter will count 120 clock pulses until such time as the next identifier pulse is accepted by the digital decoder 32. When this occurs, this next identifier pulse halts the hundreds digit up counter and enables the tens digit up counter. The tens digit up counter will now count 120 clock pulses until such time as the next identifier pulse is accepted by the digital decoder 32. Again, when this occurs, this identifier pulse halts the tens digit up counter and enables the units digit up counter. The units digit up counter and the instruction digit up counter in the address and instruction up counter circuit 34 function in a similar manner. These identifier pulses identify the number of periods (120 clock pulses) between the start pulse and the first mark pulse, which number is the numeric value of the hundreds digit; the number of periods between the first and second mark pulses, which number is the numeric value of the tens digit; the number of periods between the second and third mark pulses, which number is the numeric value of the units digit; and the number of periods between the third and fourth mark pulses, which number is the numeric value of the instruction digit.

The address identifier circuit 33 of the remote station next compares the address stored in the address up counter circuit 34 with a preloaded address contained in the address preload circuit 36. If the values stored in the hundreds digit up counter, the tens digit up counter and the units digit up counter match the values of the preloaded hundreds, tens and units digits, then the remote station will accept the entire sequence as a distinct interrogation. This acceptance enables the optional instruction control circuit 34a. Although this instruction control circuit can be designed to effect any one of a number of different commands in the remote station, circuit arrangement shown in FIG. 3 is designed to perform only one command, that is, the automatic reading of the watt-hour meter located at the particular remote station.

Assuming then that the received instruction digit requests an automatic reading of the watt-hour meter at the remote station, the matching of the preload address with the transmitted address by the address comparator circuit 35 enables the address down counter circuit 38 of the response logic circuit 37 which receives the preloaded address in the address preload circuit 36. The hundreds digit down counter, the tens digit down counter and the units digit down counter of the address down counter circuit 38 are sequentially enabled. Each of these down counters down counts to zero and upon reaching zero, sends an identifier pulse to the digital encoder 44. Each of these identifier pulses indicates the number of periods (120 clock pulses) between identifier pulses, which number is the numerical value of each of the digits stored in these down counters. The down counters in the down counter circuits 39–43 are constantly supplied with digital information by the meter encoder 45.

The digital encoder 44 receives the start and mark identifier pulses from the response logic circuit 37 and generates a marking pulse signal which is sent to the TTL/RF interface 46 and the RF transmitter 47. When the digital encoder 44 receives an identifier pulse, it allows the next synchronized XTMT pulse from the power supply and timing source 33 to excite the RF transmitter. Thus, a series of RF identifier pulses representing the remote station address and meter reading are transmitted to the central station in synchronization with the XTMT pulse signal supplied over the power lines pulse of the power distribution system. In addition, the digital encoder 44 codes the marking pulses in the data signal in a predetermined manner so that these marking pulses are uniquely identifiable by the central station.

The central station receives the RF signal generated by the RF transmitter 47 of the remote station and supplies RF identifier pulses to the RF/TTL interface 21 which supplies a marking pulse signal to the digital decoder 22 of the central station. The XTMT pulse supplied by the power supply and timing source 15 of the central station is used as a reference signal by digital decoder 22. This digital decoder 22, like the digital decoder 32 in the remote station of FIG. 3, determines whether the marking pulses of the data signal are acceptable. However, the digital decoder 22 in the central station does not receive a preselected start code from the remote station because it is enabled by the enable pulse from the transmit section of the central station. If found acceptable, the digital decoder 22 generates start and mark pulses which are supplied to the response logic circuit 23. These start and mark pulses enable the digital up counters in the up counter circuits 24–29 of the response logic circuit 23. The hundreds digit up counter is enabled by the start pulse and begins to count until the first mark identifier pulse is received by the response logic circuit 23. This first mark pulse stops the hundreds digit up counter of the address up counter circuit 24 and starts the tens digit up counter. Similarly, the subsequent mark pulses from the digital decoder 22 actuate each of the up counters in the up counter circuits 24–29. The address of the responding remote station is stored in the address up counter circuit 24 and the digital information from the meter encoder 45 of the remote station is stored in the digit up counter circuits 25–29. Each of the up counters in up counter circuits 24–29 counts the number of periods (120 clock pulses) between identifier pulses. As each of these up counters is enabled, the digital information stored therein is transferred to the central response and display 30.

The communication system shown in FIGS. 2 and 3 is capable of alerting a group of remote stations, identifying an individual member of that group, giving an instruction to that individual member transferring digital information from that individual member to the central station. This digital information includes the address of the individual members responding to the initial inquiry in addition to the desired digital information which, in the preferred embodiment, represents the instantaneous reading of a watt-hour meter. Although the elapsed real time of the entire interrogation activity from command generation at the central station to command response depends on the actual value of the digits transmitted, this elapsed real time generally will be between 350 and 900 milliseconds. Thus, on the average, the complete elapsed real time for interrogation and response is slightly more than $\frac{1}{2}$ second.

Figure 5:
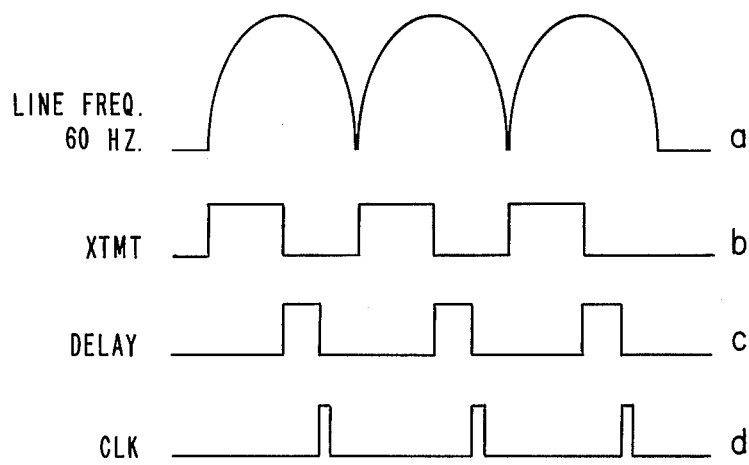
FIG. 5 is a timing diagram of the power supply and timing source shown in FIG. 4.

FIG. 4 is a circuit diagram of the power supply and timing source 15 of the central station shown in FIG. 2. This power supply and timing source is similar to the power supply and timing source 33a of the remote station shown in FIG. 8. The waveforms generated by the power supply and timing source of FIG. 4 are shown in FIG. 5 and will be described in connection with the description of FIG. 4. The power source for the power supply and timing source of FIG. 4 is a 120 volt 60 hz power signal supplied by the power lines of the power distribution system. This power source is connected through on/off switch 80 to a step down transformer 81. The step down transformer 81 is connected to a bridge rectifier 82 and a conventional voltage regulator circuit 83 which supplies VCC voltage to the integrated circuits of the central station shown in FIGS. 6 and 7. Since the voltage regulator 83 is conventional, no further details of this circuit are described herein. The step down transformer 81 is also connected through a full wave rectifier formed by diodes 84 and 85 to a monostable multivibrator 86. The output of this full wave rectifier is shown as waveform a in FIG. 5. The monostable multivibrator 86 is preferably a type SN74121 integrated circuit although other types of multivibrators may obviously be used without departing from the scope of this invention. The multivibrator 86 is connected to a biasing circuit including resistance network 87 and capacitor 88 and an external timing circuit formed by capacitor 89 and resistor 90. This external timing circuit enables the monostable multivibrator 86 to have a timing period of approximately 4 milliseconds. The Q output of the monostable multivibrator 86 is the XTMT pulse shown as waveform b in FIG. 5. The other output of the monostable multivibrator 86, which is the complement of the waveform b shown in FIG. 5, is supplied to the monostable multivibrator 91 through resistor 92 and capacitor 93. This monostable multivibrator also has an external timing circuit formed by capacitor 94 and resistor 95 which enables the monostable multivibrator 91 to generate a 2 millisecond timing period. The Q output of the monostable multivibrator 91 is the delay pulse shown as waveform c in FIG. 5. The other output of the monostable multivibrator 91 is connected through a biasing circuit 96 to monostable multivibrator 97. This monostable multivibrator 97 is preferably of the same type as monostable multivibrators 86 and 91. The monostable multivibrator 97 also has an external timing circuit 98 which enables the monostable multivibrator 97 to generate the 120 clock pulse shown as waveform *d* in FIG. 5. This 120 clock pulse is also connected to a NAND gate 99 which has a second input provided by the request logic circuit of the central station shown in FIG. 6. The function of this NAND gate 99 will be described below in connection with the description of FIG. 6. The waveforms shown in FIG. 5 which are generated by the power supply and timing source of FIG. 4 are used in the communication system of the present invention as a reference or timing signal for the central station. Similar reference or timing signals are generated by the power supply and timing source shown in FIG. 9 for the remote station.

Figure 6:
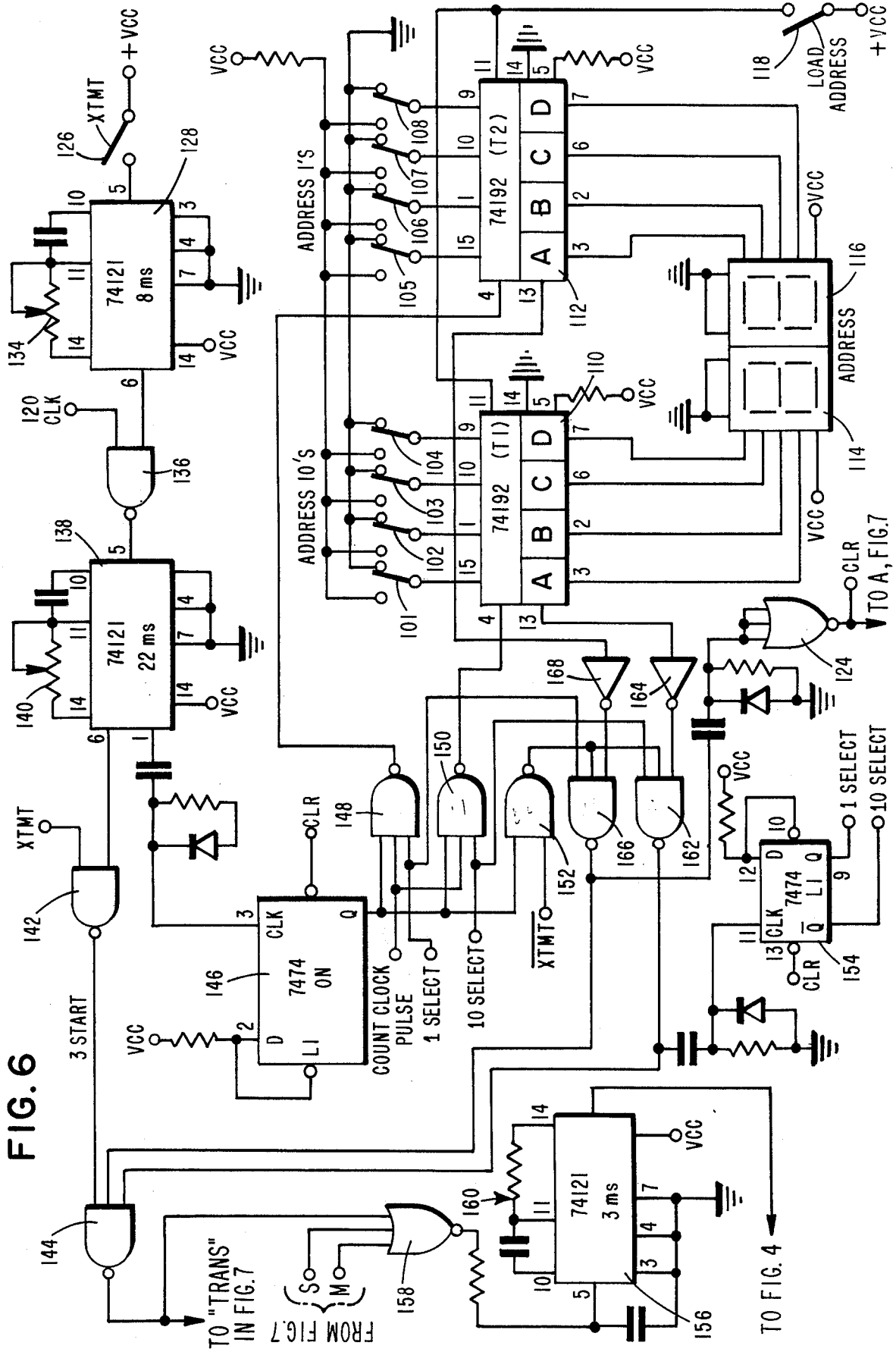
FIG. 6 is a circuit diagram of the request logic circuit and part of the digital encoder of the central station shown in FIG. 2.

FIG. 6 shows the request logic circuit 11 and the central control 10A of the central station shown in FIG. 2. In the embodiment shown in FIG. 6, the central control 10A includes a plurality of manual switches for initiating the operation of the request logic circuit and for supplying the request logic circuit with the designated address of a particular remote station. As mentioned previously, the central control 10A may take other forms other than the manual switch arrangement shown in FIG. 6. For example, rather than using the plurality of manual switches shown in FIG. 6, the operation of the request logic circuit of FIG. 6 can be initiated by a computer or data processor.

The address of a particular remote station is designated by setting the manual switches 101–108 connected to the inputs of the digital counters 110 and 112. The counter 110 is the tens digit down counter and the counter 112 is the units digit down counter. The designated address is visually displayed by display devices 114 and 116. The designated address is visually displayed by display devices 114 and 116 connected to the outputs of counters 110 and 112. After the manual switches 101–108 are set, the load address switch 118 is actuated to load the counters 110 and 112. This enables these counters to store the address designated by the manual switches 101–108.

The transmit switch 126 initiates the start code for the request logic circuit shown in FIG. 6. This transmit switch 126 triggers the monostable multivibrator 128. The monostable multivibrator 128 as well as the other monostable multivibrators in FIG. 6 are preferably integrated circuits of the type SN74121 although other types of monostable multivibrators may obviously be used without departing from the scope of this invention. An external timing circuit 134 sets the timing period for the monostable multivibrator 128 at approximately 8 milliseconds. The output of the monostable multivibrator is connected to NAND gate 136 which has a second input provided by the 120 clock pulse of the power supply and timing source of FIG. 4. The combination of the output of the monostable multivibrator 128 and the 120 clock pulse at NAND gate 136 enables NAND gate 136 to generate a single output phase which is used for triggering the monostable multivibrator 138. The monostable multivibrator 138 has an external timing circuit 140 which enables the monostable multivibrator 138 to generate an output pulse of sufficient length to result in a start code having three start pulses. The timing period for the monostable multivibrator 138 is set at approximately 22 milliseconds. The Q output of the monostable multivibrator 138 is connected to a NAND gate 142 which has a second input connected to receive the STMT pulse supplied by the power supply and timing source of FIG. 4. The timing period of the monostable multivibrator 138 is greater than the time period required for supplying three XTMT pulses of the transmit pulse signal to the NAND gate 142. The three start pulse signal generated at the output of NAND gate 142 is supplied to NAND gate 144 which supplies this start code to the digital encoder 16 shown in FIG. 2. The digital encoder 16, which is identical to the digital encoder shown in FIG. 11B, for the remote station supplies a marking pulse signal to the RF transmitter of the central station.

A second output of the monostable multivibrator 138 is used to supply count clock pulses to the digital counters 110 and 112. This output of the monostable multivibrator 138 is connected to the clock input of JK flipflop 146. The Q output of JK flipflop 146 is connected to one of the inputs of each of the NAND gates 148, 150 and 152. The output of NAND gate 148 is connected to the down count input of the units down counter 112 and the NAND gate 150 is connected to the down count input of the tens down counter 110. The NAND gates 148 and 150 are alternately actuated by another JK flipflop 154 which has its Q output connected to one of the inputs of NAND gate 148 and its Q complement output connected to one of the inputs of NAND gate 150. Since the Q complement output of this JK flipflop 154 is normally set high, the NAND gate 150 connected to the tens digit down counter 110 is first actuated by the JK flipflop 154. After the tens digit down counter 110 generates an output pulse, the JK flipflop 154 changes state and actuates the NAND gate 148.

A third input to each of the NAND gates 148 and 150 is supplied by the power supply and timing source of FIG. 4. These inputs of NAND gates 148 and 150 are each connected to the output of NAND gate 99 in the power supply and timing source which provides a count clock pulse for the NAND gates 148 and 150. The characteristics of this count clock pulse are determined in part by the response logic circuit shown in FIG. 6. Each time an output data pulse is supplied through NAND gate 144, the monostable multivibrator 156 connected to one of the inputs of NAND gate 99 is triggered through NOR gate 158. The timing period of the monostable multivibrator 156 is determined by timing circuit 160. In this manner, each time a data output pulse is supplied by the NANd gate 144 to the digital encoder of the central station, the next pulse in the 120 clock pulse which is connected to NAND gate 99 is suppressed by monostable multivibrator 156. As a result, the inverted 120 clock pulse at the output of NAND gate 99 of the power supply and timing source of FIG. 4 is not precisely equivalent to the inverted 120 clock pulse. The count clock pulse generated at the output of NAND gate 99 is supplied to the down counters 110 and 112 in the request logic circuit through NAND gates 148 and 150.

The outputs of the down counters 110 and 112 are supplied to the digital encoder through NAND gates 162 and 166. The output of the tens digit down counter 110 is connected to NAND gate 110 is connected to NAND gate 162 through inverter 164. The NAND gate 162 has a second input supplied by the Q complement output of the JK flipflop 154. The third input of the NAND gate 162 is the XTMT pulse shown as waveform *b* in FIG. 5 which is supplied to NAND gate 162 through NAND gate 152. This XTMT pulse is used as a reference signal in generating the data pulse output of NAND gate 162. The output data pulse of NAND gate 162 is then supplied to the digital encoder of the central station through NAND gate 144. The output of the units digit down counter 112 is connected to NAND gate 166 through inverter 168. One of the other inputs of NAND gate 166 is connected to the Q output of the JK flipflop 154 which actuates its Q output in respone to the data pulse supplied to the output NAND gate 144 by the tens digit down counter 110. That is, the JK flipflop 154 changes state in response to a data pulse provided by the output of NAND gate 162. The third input of NAND gate 166 receives the XTMT pulse signal from the NAND gate 152. As a result, the output signals from down counters 110 and 112 are synchronized with the XTMT pulse signal by NAND gates 162 and 166. The output pulse of NAND gate 166 is used through NOR gate 124 to lear the SN flip-flops in the transmit section and enable the receive section (shown in FIG. 7).

Although the operation of the request logic circuit of the central station has been described in connection with the description of the circuit in FIG. 6, a brief discussion of the operation of this circuit will enhance the understanding of the present invention. When it is decided that an instruction is to be sent to a particular remote station, the distinct address of that remote station is supplied to the two decade counters which represent the two digits of that remote station's address. This may be done either manually or under the control of a computer. The start code section of the request logic circuit is then enabled and, according to the preferred embodiment shown in FIG. 6, three sequential start pulses are sent to the digital encoder of the central station. The generation of the third start pulse automatically enables the tens digit down counter 110 which down counts in synchronization with the count clock pulse supplied by the power supply and power source in FIG. 4. The tens digit down counter 110 down counts from the numerical value of the digit previously loaded therein to zero at which point it will generate an output marking pulse to the digital encoder. In addition, the data output pulse of the tens digit down counter 110 enables the down count function of the units digit down counter 112. As a result, the units digit down counter 112 down counts to zero in a similar manner and generates a marking output pulse to the digital encoder. The marking output pulses generated by the down counters 110 and 112 are synchronized with a XTMT pulse from the XTMT pulse signal supplied by the power supply and timing source in FIG. 4. This XTMT pulse signal is derived from the 60 hz frequency of the power distribution system. These XTMT pulses enable both the central station and the remote stations in the communication system of the present invention to identify the number of periods (120 clock pulses) between the marking pulses of the data pulse signal. In this manner, the reference signals generated by the power supply and timing source shown in FIG. 4 are used in combination with the marking pulse signal. In this manner, the reference signals generated by the power supply and timing source shown in FIG. 4 are used in combination with the marking pulse signal transmitted by radio waves to transmit digital information between the central station and the remote stations.

Figure 7:
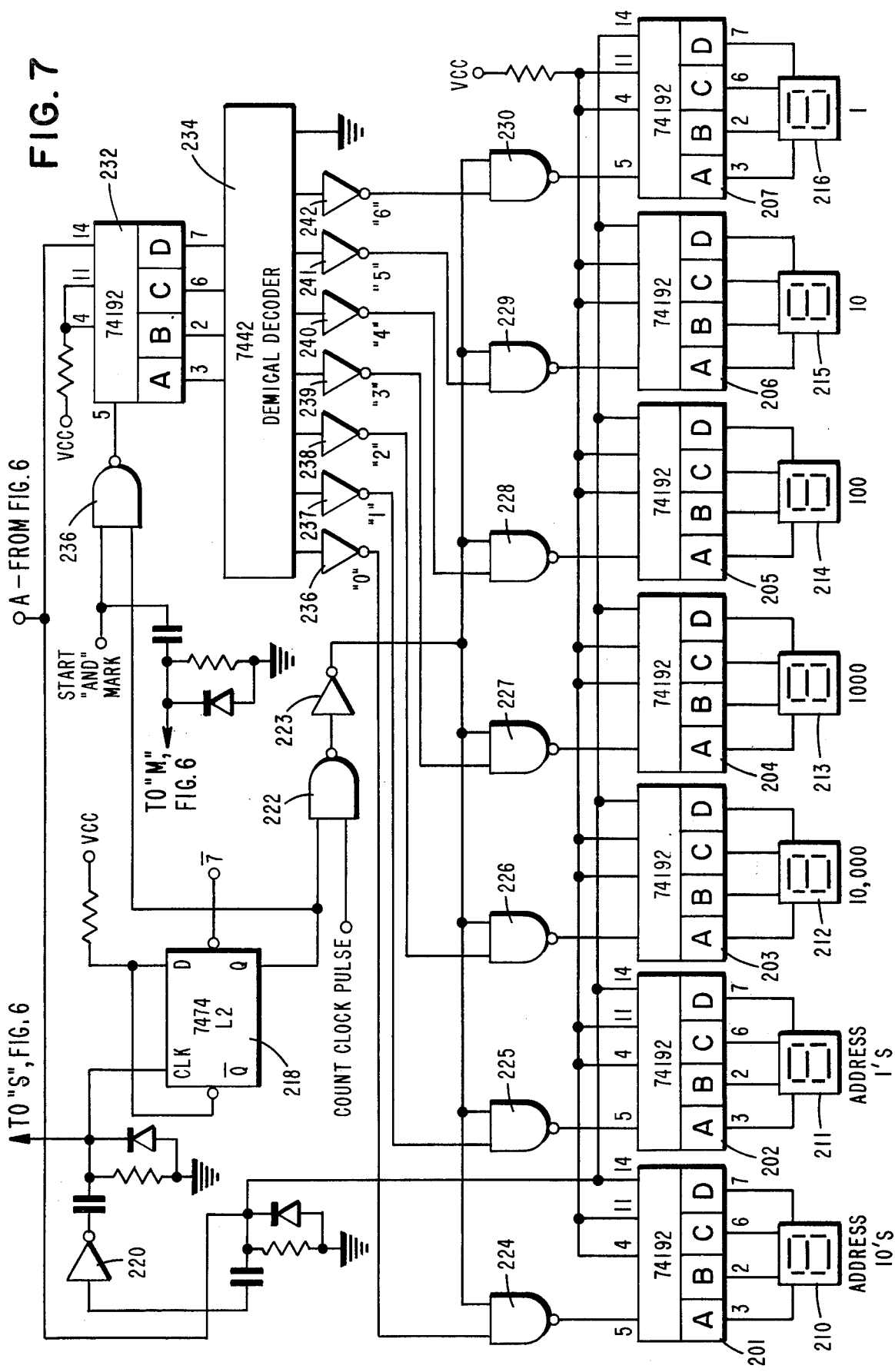
FIG. 7 is a circuit diagram of the response logic circuit of the central station shown in FIG. 2.

FIG. 7 shows the response logic circuit and the central display for the receiver portion of the central station shown in FIG. 2. The digital decoder of the central station shown in FIG. 2 supplies start and mark pulses to the response logic circuit shown in FIG. 7. The digital decoder for the central station generates these start and mark pulses from the marking input signal received from the remote stations. The digital decoder of the central station is similar in design to the digital decoder of the remote stations. The digital decoder of the central station is identical in design to the digital decoder of the remote station shown in FIG. 9 and described below.

The enable pulse from the transmit section shown in FIG. 6 is supplied to the clear inputs of the digital up counters 201–209 of the response logic circuit of FIG. 7, it is also supplied to sequencer 232 to prepare it to receive start and mark pulses. The up counter 201 is the tens digit address up counter and the up counter 202 is the units digit address up counter. The remaining up counters 203–207 are used to count the digital information sent by the particular remote station. As shown in the preferred embodiment, the digital information sent by the remote station contains five digits. The outputs of these up counters 201–207 are connected to a plurality of display devices 210–216. For example, these display devices may be visual display devices as shown in FIG. 7 or the outputs of the up counters 201–207 may be connected to a central computer for information processing. It should be understood that the present invention is not limited to a particular type of display device since many different uses can be made of the digital information transmitted to the up counters 201–207.

The enable pulse from the transmit section shown in FIG. 6 pulse is also supplied to the clock input of JK flipflop 218 through inverter 220. The JK flipflop 218 controls the connection of the count clock pulse of the power supply and timing source of FIG. 4 to the up counters 201–207 of the response logic circuit. The Q output of the JK flipflop 218 is connected to NAND gate 222 which has a second input for receiving the count clock pulse from the power supply and timing source. The output of the NAND gate 222 is connected to a plurality of NAND gates 224–230 through an inverter 223. Thus, the JK flipflop 218 controls the supply of the count clock pulse to the inputs of the NAND gates 224–230.

The JK flipflop 218 also controls the actuation of a second input in each of these NAND gates 224–230 by controlling the operation of sequencer 232 and BCD-decimal decoder 234. The Q output of the JK flipflop 218 is connected to the sequencer 232 through the NAND gate 236. The other input of the NAND gate 236 receives the start and mark pulses supplied by the digital decoder of the central station. The coincidence of the Q output of the JK flipflop 218 and each of the start and mark pulses at NAND gate 236 enables sequencer 232 to actuate its outputs. The sequencer 232 is an up/down counter which is preferably an integrated circuit of the type SN74192. The outputs of the sequencer 232 are connected to BCD-decimal decoder 234 which has a plurality of outputs, one of which is connected to each one of the NAND gates 224–230. An additional output of the BCD-decimal decoder 234 is connected to the reset input of the JK flipflop 218. One of the inverters 236–242 is connected to each one of the outputs of the BCD-decimal decoder 234 which lead to NAND gates 224–230. The BCD-decimal decoder 234 sequentially actuates the outputs connected to NAND gates 224–230. The output of the decoder 234 connected to NAND gate 224 is normally energized so that receipt of a start pulse by the response logic circuit will immediately enable NAND gate 224 which supplies the count clock pulse to the tens digit address up counter 201. The first mark pulse sent by the digital decoder then arrives at NAND gate 236 which enables sequencer 232 and decoder 234 to actuate the output of the decoder 234 connected to the NAND gate 225 which supplies the count clock pulse to the units digit address up counter 202. In this manner, the mark pulses received by the response logic circuit enable the decimal decoder 234 to sequentially actuate the outputs connected to NANd gates 224–230. These NAND gates 224–230 actuate the up count function of the up counters 201–207 so that the digital information transmitted by the particular remote station is received by the central station. The last mark pulse received by the response logic circuit enables the decimal decoder 234 to reset the JK flipflop 218 which disconnects the count clock pulse from the NAND gates 224–230.

The operation of the response logic circuit shown in FIG. 7 will now be briefly described. When a data signal arrives at the receiver of the central station, the digital decoder decodes the marking signal and synchronizes the marking pulses in the data signal with the XTMT pulses in the XTMt pulse signal derived from the 60 hz frequency of the power distribution system. If these marking pulses are received coincident with XTMT pulses, the data pulses are accepted by the digital decoder of the central station and supplied to the response logic circuit of FIG. 7 as start and mark pulses. The response logic circuit of FIG. 7 includes a plurality of digital up counters 201–207 which are sequentially energized by the start and mark pulses. Counter 201 is enabled by the "enable pulse" from the transmit section and counts until such time as the first start or makr pulse is received from the digital decoder. The first start or mark pulse has the effect of stopping the counting of up counter 201 thereby locking in a particular digit while at the same time starting the counting of up counter 202. In this manner, each of the up counters 201–207 is sequentially stopped by the successive mark pulses. The digital information transmitted by the particular remote station is then stored in the up counters 201–207 which can be used to supply this digital information to any number of possible output devices.

Figure 8:
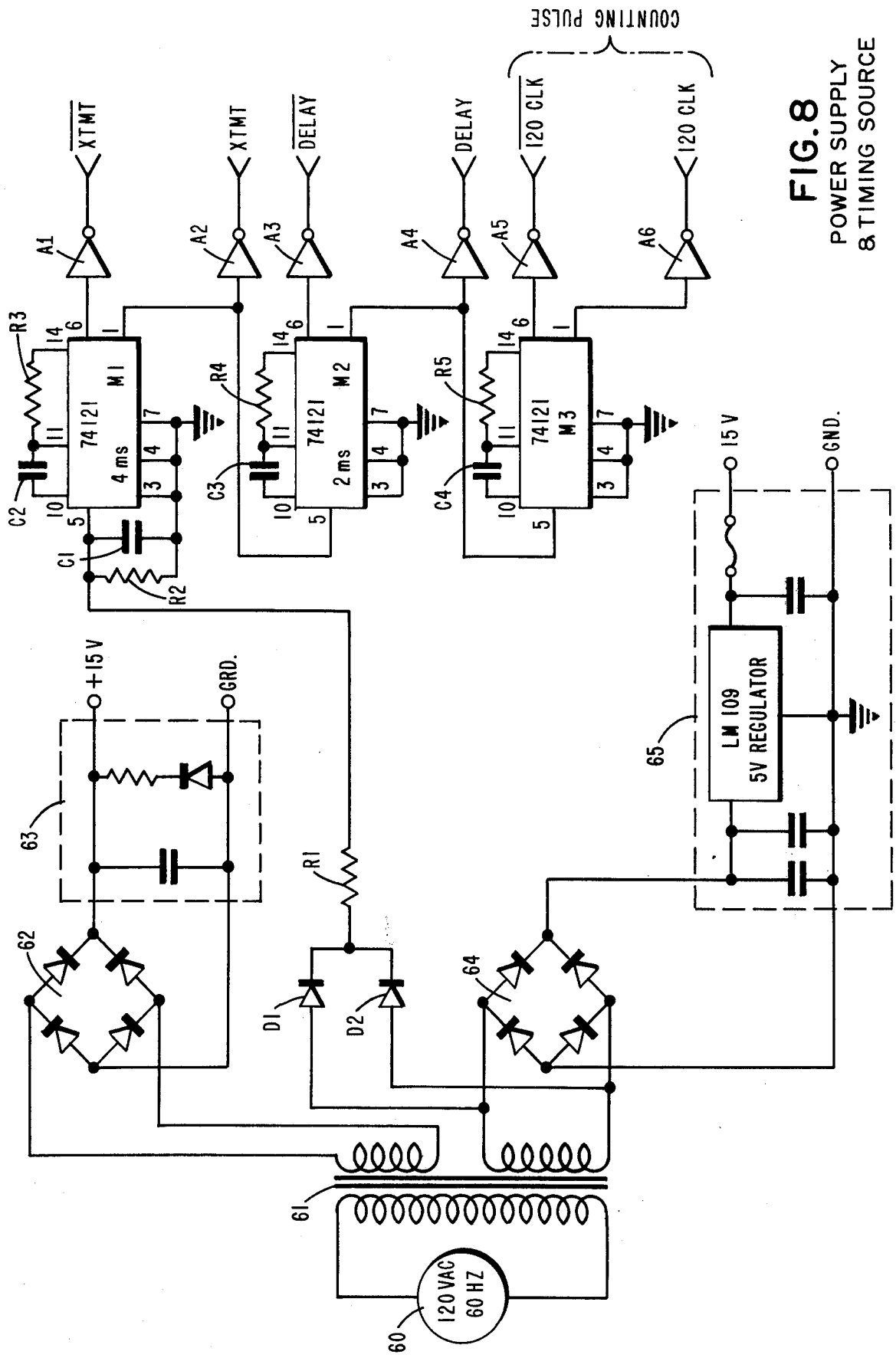
FIG. 8 is a circuit diagram of the power supply and timing source of the remote station shown in FIG. 3.

The circuit diagram for the power supply and timing source 33 in the remote station of FIG. 3 is shown in FIG. 8. The 60 hz - 120 volt power source of the power distribution system supplies power to the power supply and timing sources in the central station and the remote stations. These stations are connected to each other by fact of their mutual connection to the synchronizing 60 hz frequency of the power distribution system, which is also the power source to each of these stations. The power source 60 in FIG. 8 is connected to step down transformer 61 which is connected to the bridge rectifier 62. The bridge rectifier 62 is connected to a standard 15 volt regulator circuit 63 which supplies a bias voltage of 15 volts DC to the remote station circuits shown in FIGS. 9, 11A and 11B. The transformer 61 is also connected to bridge rectifier 64 which is connected to a 5 volt voltage regulator 65. This regulator 65 supplies 5 volts DC to the integrated circuits of the remote station shown in FIGS. 9, 11A and 11B. The voltage regulators 63 and 65 are both of known construction and as a result, no further description is contained herein. The power supply and timing source of FIG. 8 also contains a full wave rectifier including diodes D1 and D2 which are connected to the step down transformer 61. The voltage generated by the full wave rectifier 66 is shown in the timing diagram of FIG. 10 as a waveform $a$. This voltage is connected through a resistive-capacitive network including resistors R1-R2 and capacitor C1 to the monostable multivibrator M1. The monostable multivibrator M1 is a known integrated circuit component, preferably of the type SN74121 having complementary outputs. The timing period (4 milliseconds) for this monostable multivibrator is externally controlled by the timing circuit comprising capacitor C2 and resistor R3. The first and second outputs of the monostable multivibrator M1 are inverted be inverters A1 and A2; these outputs are supplied to the relevant points of the remote station circuits shown in FIGS. 9, 11A and 11B. The output waveform XTMT of inverter A2 is shown as waveform d in FIG. 10 and the output waveform of the inverter A1 is the inverted waveform XTMT. The second output of the monostable multivibrator M1 is also supplied to a second monostable multivibrator M2, preferably of the type SN74121, which generates a second waveform. A second timing circuit including capacitor C3 and resistor R4 is connected to this second monostable multivibrator M2. The timing period for this monostable multivibrator M2 is set at 2 milliseconds. The complementary outputs of this monostable multivibrator M2 are connected to inverters A3 and A4 which is connected to the circuit shown in FIG. 9. The output of inverter A4 is shown as waveform $c$ in FIG. 10. The output of monostable multivibrator M2 which is connected to inverter A4 is also connected to a third monostable multivibrator M3. This multivibrator M3 generates yet another pair of waveforms for the circuits shown in FIGS. 9, 11A and 11B. A timing circuit including capacitor C4 and resistor R5 determines the time period of the waveform generated by monostable multivibrator M3. The outputs of this monostable multivibrator M3 are connected to inverters A5 and A6. The output waveform of inverter A6 is shown as waveform $d$ in FIG. 10 and the other output waveform of inverter A5 is the complement of waveform $d$ in FIG. 10.

Figure 9:
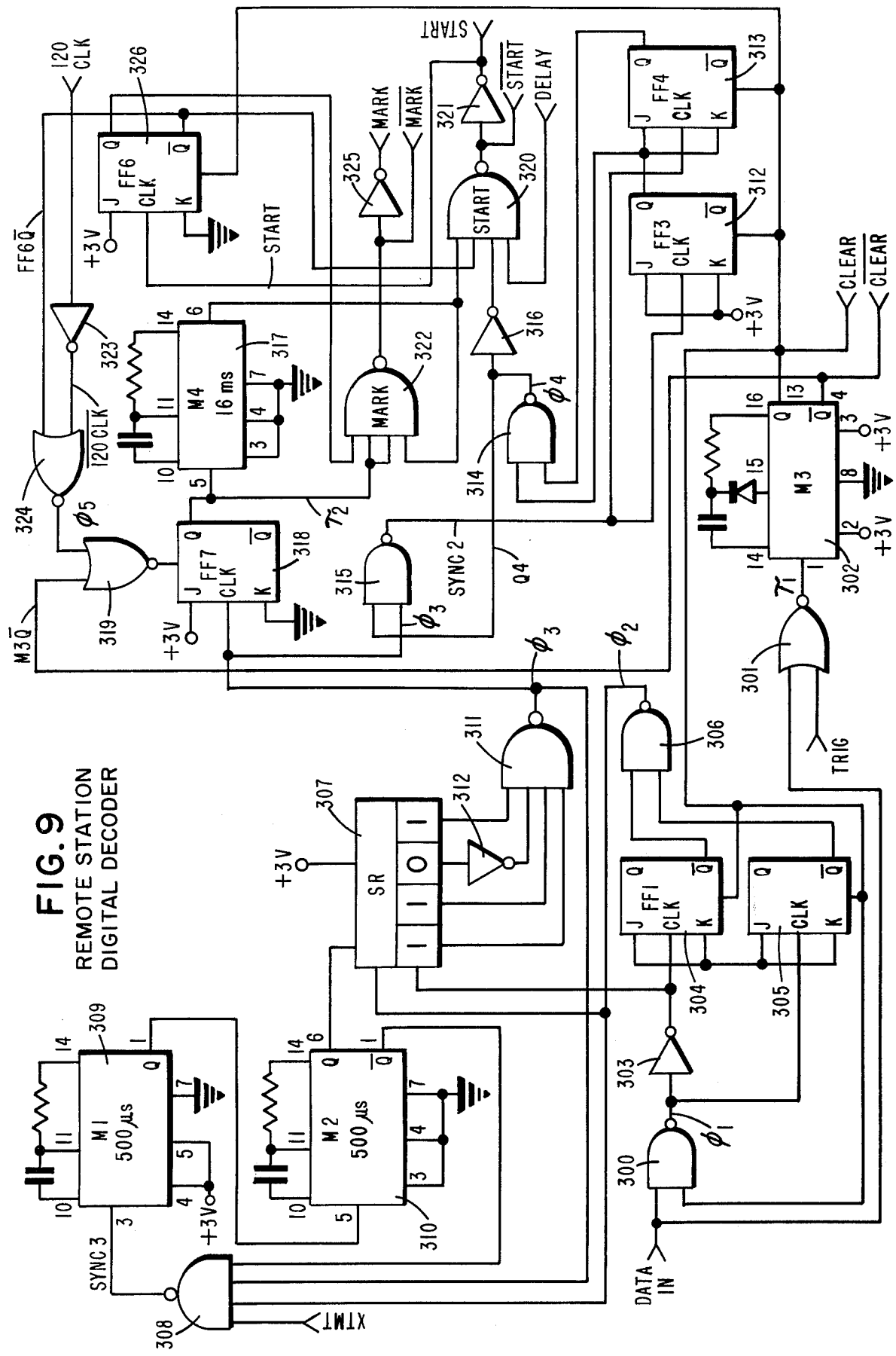
FIG. 9 is a circuit diagram of the digital decoder of the remote station shown in FIG. 3.
Figure 10:
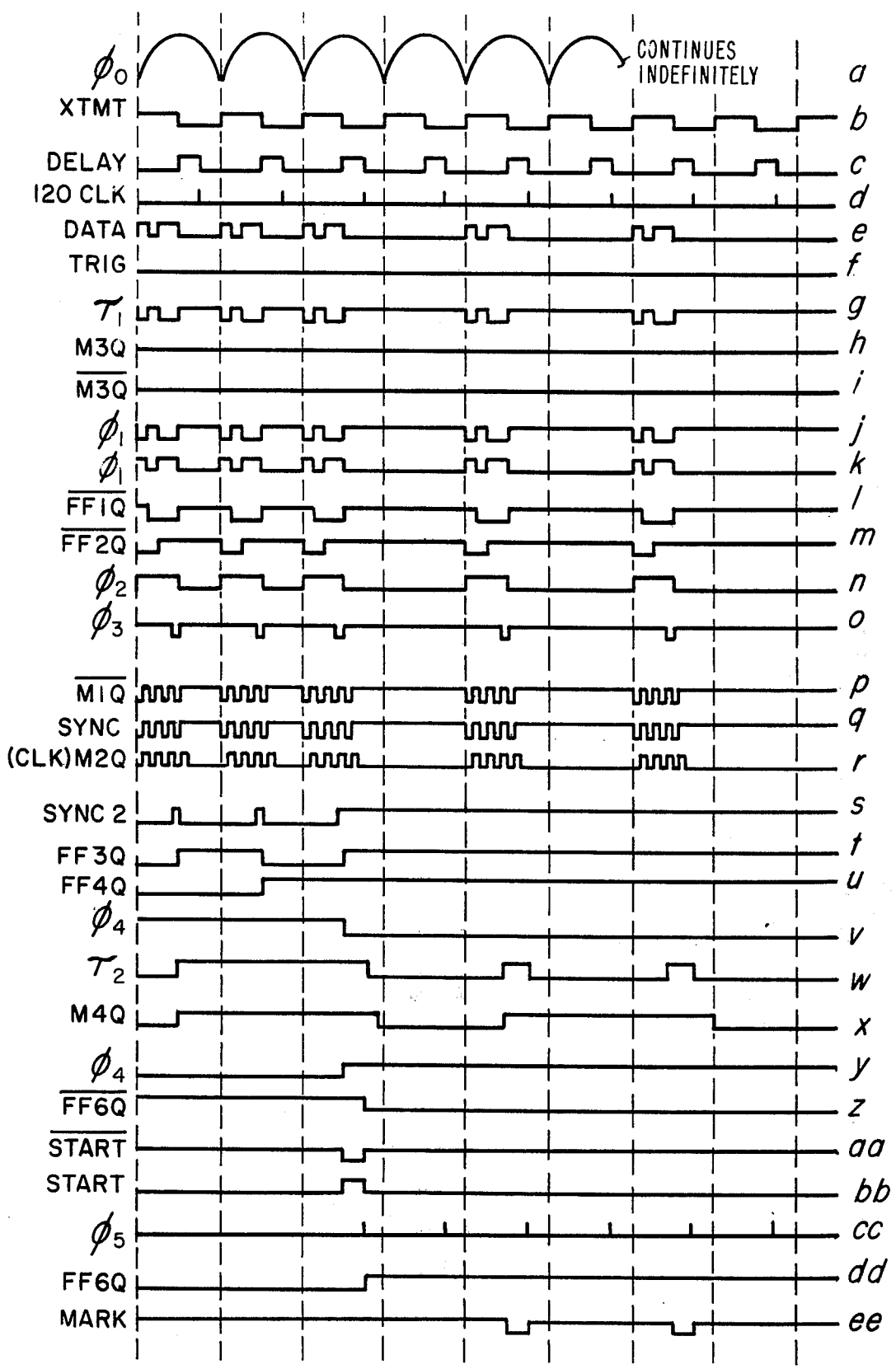
FIG. 10 is a timing diagram for the digital decoder of the remote station shown in FIG. 9.

The remote digital decoder 32 of FIG. 3 is shown in further detail in FIG. 9. The input signal for this digital decoder 32 is the marking pulse signal received by the RF receiver 30 and the RF/TTL interface 31 which is shown as waveform $e$ in FIG. 10. The first three groups of marking pulses in waveform $e$ represent the three start pulses generated by the start code logic circuit 12 of FIG. 2. The next two groups of pulses in waveform $e$ represent the two mark pulses indicating the numeric value of the tens digit and the units digit. The marking pulses of waveform $e$ are supplied to one of the inputs of NAND gate 300 and one of the inputs of NOR gate 301. Waveform $f$ of FIG. 10 which is continued as waveform $y$ in FIG. 12 forms the other input of the NOR gate 301. The output of the NOR gate 301 is shown as waveform $g$ in FIG. 10. Thus, NOR gate 301 is supplied with marking input pulses during both the reception of data pulses and the transmission of marking pulses. The output waveform $g$ of FIG. 10 is supplied to monostable multivibrator 302 (preferably integrated circuit type SN74123N) which has an external resistive-capacitive timing circuit connected thereto as shown in FIG. 9 which determines the switching time period of monostable multivibrator 302. Waveform $h$ in FIG. 10 and its complement shown as waveform $i$ are generated by multivibrator 302. These waveforms are the CLEAR and complement CLEAR pulse signals for the remote station decoder shown in FIG. 9 and the remote logic circuit of FIG. 11A. These CLEAR pulse signals reset the logic elements in the decoder and the remote logic circuit after a transmission is completed.

The NAND gate 300 which is supplied with the marking input pulses (waveform e in FIG. 10) has an output pulse signal shown as waveform j in FIG. 10. This waveform is used to generate the framing pulse shown as waveform n in FIG. 10. This framing pulse is generated by connecting the output of the NAND gate 300 to the clock input of the JK flipflops 304 and 305. Waveform j is first inverted by inverter 303 before being applied as a clock input to JK flipflop 304. The output waveform of the inverter 303 is shown as waveform k in FIG. 10. The Q complement waveforms of JK flipflops 304 and 305 shown as waveforms 1 and m in FIG. 10 are used to generate the framing pulse. These waveforms l and m are supplied to NAND gate 306 which generates the framing pulse shown as waveform n in FIG. 10.

The circuit arrangement shown in FIG. 9 also includes a matching circuit formed primarily by shift register 307 and NAND gate 311. The shift register 307 is preferably integrated circuit type SN74164N though other types of shift registers may be used. As shown in waveform e of FIG. 10 each marking pulse in the data input pulse signal is characterized by the same preselected binary code. In the embodiment shown in FIG. 9, this binary code is selected as 1-0-1-1. The shift register 307 of the matching circuit is intended to compare each of the incoming marking pulses in the data pulse signal with this preselected binary code. At the same time, each marking pulse of the marking input pulse signal must match the frame pulse waveform n generated by the framing circuit described above. That is, each marking pulse of the data input pulse signal must match bolt one of the pulses in waveform n of FIG. 10 and the binary code 1-0-1-1. This is accomplished by supplying the framing pulse waveform n of FIG. 10 as well as the marking input pulse signal waveform k of FIG. 10 directly to the inputs of the shift register 307. The clock input for the shift register 307 is supplied by a clock pulse generator circuit described below including NAND gate 308 and monostable multivibrators 309 and 310.

In the preferred embodiment shown in FIG. 9, each marking pulse in the marking pulse signal waveform e is 4 milliseconds long. In addition, the binary code which characterizes each of these groups of marking pulses includes four binary numbers, that is, the binary code is equivalent to 1-0-1-1. As a result, the clock pulse generator for shift register 307 must generate four clock pulses during each marking pulse of the data input pulse signal. The timing circuits for the monostable multivibrators 309 and 310 are thus set to enable these monostable multivibrators to generate four clock pulses each 500 microseconds long with 500 microsecond separation. This is accomplished by connecting the following pulse signals to NAND gate 308: the XTMT pulse shown as waveform b; the framing pulse shown as waveform n; the matching pulse shown as waveform o; and the complement of the clock pulse generated by the monostable multivibrator 310 shown as waveform r in FIG. 10. The output of this NANd gate 308, which is shown as waveform q in FIG. 10, is connected to one of the inputs of monostable multivibrator 309. The output of monostable multivibrator 309, which is shown as waveform p in FIG. 10, is connected to one of the inputs of the monostable multivibrator 310. The Q output of the monostable multivibrator 310, shown as waveform in FIG. 10, is connected to the clock input of the shift register 307. The Q complement output of the monostable multivibrator 310 is fed back to one of the inputs of the NAND gate 308 as described previously. Thus, by connecting the XTMT pulse to the clock pulse generator for the shift register 307, the marking pulses of the data input pulse signal of the remote station must match one of the pulses of the XTMT pulse signal before the matching pulse signal shown as waveform o in FIG. 10 can be generated. This matching pulse signal is used by the remaining portion of the remote station digital decoder of FIG. 9 to generate the start and mark pulses which enable the remote station logic circuit of FIG. 11A to operate. The binary 1 outputs of the shift register 307 are connected directly to the match NAND gate 311 while the zero binary output of the shift register 307 is connected to the match NAND gate 311 through inverter 312. Thus, in order for NAND gate 311 to generate the match pulse shown in waveform o of FIG. 10, the binary code 1-0-1-1 must occur in each marking pulse of the data input pulse signal and, in addition, each of these marking pulses must match one of the XTMT pulses shown in waveform b of FIG. 10.

The XTMT pulse signal shown in waveform b is generated by the power supply and timing source shown in FIG. 8 which is located at the remote station. This XTMT pulse signal is derived from the 60 hz power signal supplied over the power lines of the power distribution system. By using this power signal to generate the XTMT pulse signal, the power signal is used by the digital decoder of the communication system of the present invention as a reference signal in generating the start and mark pulses for the remote logic circuit of FIG. 11A. The combination of this reference signal and the marking input pulse signal enables the remote station to receive digital information. Similarly, the central station decoder, which is equivalent to the decoder in the remote stations enables the central station to receive digital information by combining the above reference signal and a marking signal transmitted by one of the remote stations.

In the preferred embodiment of the present invention, the start code generated in the central station contains three successive data pulses. The digital decoder in each of the remote stations of the present invention is capable of counting the number of data pulses in the start code. The circuit shown in FIG. 8 includes a start code counting circuit comprising JK flipflops 312 and 313. These JK flipflops 312 and 313 are connected in such a manner that they will count three pulses supplied at their clock inputs and enable a NAND gate 314 connected thereto supply an output pulse upon the occurrence of the third start code data pulse at the clock inputs of these JK flipflops 312 and 313. The clock inputs for these JK flipflops 312 and 313 are connected to the output of NAND gate 315 which receives at one of its inputs the match pulse shown as waveform o in FIG. 10. A second input of the NAND gate 315 is the output pulse of the NAND gate 314. The clock pulse provided by NAND gate 315 to the JK flipflops 312 and 313 is shown as waveform s in FIG. 10. The Q output waveforms of the JK flipflops 312 and 313 are shown as waveforms t and u, respectively, in FIG. 10. The output waveform of this start code counting circuit which is formed at the output of NAND gate 315 is shown as waveform v in FIG. 10. This output waveform v is then inverted by inverter 316 which produces the inverted waveform *y* shown in FIG. 10.

In addition to the start code counting circuit described above, the digital decoder shown in FIG. 9 also includes a start pulse framing circuit which establishes a time frame within which the three start pulses of the marking input signal must be received and counted by the start code counting circuit described above before the logic circuit of FIG. 11A of the remote station is energized. This start pulse framing circuit includes monostable multivibrator 317 which is connected to the Q output of JK flipflop 318. This JK flipflop 318 receives the match pulse signal shown as waveform *o* in FIG. 10 and generates waveform *w* of FIG. 10 at its Q output. This JK flipflop 318 is reset through a NOR gate 319 which has one input connected to the clear pulse generator described above and another input connected to a clock generator described below. In the preferred embodiment of the present invention, the monostable multivibrator 317 is a type SN74121N integrated circuit which has an external timing circuit which enables the start code counting circuit to count the first three pulses (start pulses) of the match pulse signal waveform *o* in FIG. 10. The Q output of the monostable multivibrator 317, which is shown as waveform *x* in FIG. 10, is connected to one of the inputs of NAND gate 320. Another input of the NAND gate 320, waveform *y*, is supplied by the inverter 316 connected to the start code counting circuit. A third input to the NAND gate 320 is the delay pulse waveform *c* which is generated by the power supply and timing source shown in FIG. 8. The coincidence of these three waveforms at NAND gate 320 together with the Q complement output of the JK flipflop 326, shown as waveform *z* in FIG. 10, enable the NAND gate 320 generate the complement start pulse as shown in FIG. 9. The NAND gate 320 is also connected to an inverter 321 which generates at its output the start pulse of the digital decoder. This start pulse is supplied by the digital decoder to the remote station logic circuit shown in FIG. 11A and is also supplied to the clock input of the JK flipflop 326. The complement start pulse and the start pulse are shown as waveform *aa* and *bb*, respectively, in FIG. 10.

As mentioned above, the start pulse waveform *bb* is also supplied to the JK flipflop 326 which has a Q output connected to both the NAND gate 322 and the NAND gate 320 described above. The JK flipflop 326 actuates the NAND gate 320 during the generation of the start pulse and then actuates the NAND gate 322 during the generation of the mark pulses. The Q output of the JK flipflop 326 is shown as waveform *dd* in FIG. 10. An additional input to the NAND gate 322 is supplied by the JK flipflop 318 described above. This JK flipflop 318 responds to the match pulse signal waveform *o* at its clock input to generate waveform *w* of FIG. 10. The JK flipflop 318 is reset through NOR gate 319 by the 120 clock pulse provided by the power supply and timing source shown in FIG. 8. The 120 clock pulse is connected to the NOR gate 319 through inverter 323 and NOR gate 324 which also is connected to the complement Q output of the JK flipflop 326. As shown by the waveform *cc* in FIG. 10, the JK flipflop 318 is reset by the 120 clock pulse whenever the Q output of the JK flipflop 326 is high. The coincidence at NAND gate 322 of the Q output of the JK flipflop 318 and the Q output of the JK flipflop 326 together with the delay pulse waveform *c* causes NAND gate 322 to generate the complement mark pulse shown as waveform *ee* in FIG. 10. An inverter 325 is connected to the output of NAND gate 322 to generate the mark pulse which is supplied to the remote logic circuit shown in FIG. 11A.

Although the operation of the digital decoder shown in FIG. 9 has been described in connection with the circuit elements set forth above and the timing diagram of FIG. 10, a brief summary of the operation of this digital decoder will further enhance the understanding of the present invention. The marking pulses of the marking pulse signal sent from the central station arrives at the digital decoder as waveform *e* in FIG. 10. The digital decoder compares these marking pulses with the XTMT pulse supplied by the power supply and timing source. Each marking pulse of the data input pulse signal is then digitally divided into four parts for purposes of identification. Each of these parts must be of a predetermined specific duration and must match a preselected binary code. In other words, each marking pulse of the data input pulse signal must be coincident with a XTMT pulse, be of a definite time duration, and match a specified binary code prior to acceptance by the digital decoder. Three of these marking pulses must occur within a given time frame in order to be accepted by the digital decoder as a start code. Additional marking pulses in the marking input pulse signal are then accepted by the digital decoder provided they meet the above identification requirements. These marking pulses result in the generation of the mark pulses supplied by the digital decoder to the logic circuit of FIG. 11A. These mark pulses then are used by the circuit in FIG. 11A to determine the address designated by the central station.

FIG. 11A shows a detailed circuit diagram for the remote address identifier logic circuit 33 and the remote response logic circuit 37 of FIG. 3. This circuit can be conveniently divided into several parts including a count clock generator, an address counter, an address comparator, a response sequencing circuit and a plurality of response counters. The count clock generator of FIG. 11A generates a count clock pulse signal for stepping all the digital counters shown in FIG. 11A. This count clock generator includes JK flipflop 400, NOR gate 401, NAND gate 402 and inverter 403. The JK flipflop 400 has J and K inputs set as shown in FIG. 11A and has a 120 clock pulse at its clock input. This 120 clock pulse is derived from the power supply and timing source of the remote station shown in FIG. 8. The JK flipflop 400 has a reset circuit connected to its reset input including NOR gate 401 which has a plurality of inputs including the start pulse waveform *b* of FIG. 12, the mark pulse waveform *c* of FIG. 12, and the trigger pulse waveform *y* in FIG. 12 which is described in further detail below. The reset pulses provided at the reset input of JK flipflop 400 cause the Q output of the JK flipflop 400 to go low and remain low until the next 120 clock pulse appears at the clock input of the JK flipflop 400. The Q output of the JK flipflop 400, which is shown as waveform *e* in FIG. 12, is supplied to a NAND gate 402 which has a second input connected to the 120 clock pulse. The output of the NAND gate 402 is connected to inverter 403. The coincidence of the Q output of the JK flipflop 400 and the clock pulses of the 120 clock pulse at NAND gate 402 results in the generation of the count clock pulse signal shown as waveform *d* in FIG. 12 at the output of the inverter 403. The count clock pulses in the count clock pulse signal occur between the start pulse of waveform *b* and the first mark pulse of waveform c and then between each successive mark pulse of waveform c. The operation of the JK flipflop 400 together with the NAND gate 402 prevent the occurrence of a count clock pulse coincident with a start pulse or a mark pulse. Referring now to the start pulse of waveform b, the mark pulse of waveform c and the count clock pulse of waveform d, it should be noted that any number of count clock pulses may occur between the start pulse and the first mark pulse and each of the subsequent mark pulses. That is, although the waveforms shown in FIG. 12 only show one count clock pulse occurring between each of the above start and mark pulses, additional count clock pulses may occur depending upon the address designated by the central station and received by the remote station. This will be described in further detail below.

The start pulse of waveform b which is supplied to the circuit of FIG. 11A by the digital decoder shown in FIG. 9 is connected to the clock input of the JK flipflop 404. The Q output of this JK flipflop 404 which is shown as waveform f in FIG. 12, triggers one input of the NAND gate 405 which has a second input triggered by the count clock pulse generated by the count clock generator. An inverter 406 is connected to the output of the NAND gate 405. The coincidence of the Q output of the JK flipflop 404 and the count clock pulse at NAND gate 405 generates a read count clock pulse shown as waveform h in FIG. 12. This read count clock pulse is supplied to NAND gate 407 and 408 which each have a second input connected to the JK flipflop 409. The NAND gate 407 is connected to the Q output of the JK flipflop 409 while the NAND gate 408 is connected to the Q complement output of the JK flipflop 409. The operation of the JK flipflop 409 is controlled by the mark pulse shown in waveform c whereas the JK flipflop 404 is controlled by the start pulse of waveform b. The complement Q output of the JK flipflop 409 supplied to the NAND gate 408 is shown as waveform g in FIG. 12. As is clear from the comparison of these respective waveforms, the NAND gates 407 and 408 connected to the outputs of the JK flipflop 409 are alternately actuated. The NAND gate 408 is first actuated by the coincidence of the Q complement output of the JK flipflop 409 and the read clock pulse of waveform h. The NAND gate 408 generates an output waveform, shown as waveform i in FIG. 12, which is supplied to the tens digit up/down counter 410. The tens digit up/down counter is preferably a standard reversible digital up/down counter such as integrated circuit type SN74192 although other counters may be used without departing from the scope of the present invention. The tens digit up/down counter 410 begins up counting from 0 in response to the read clock waveform i provided by the NAND gate 408. For example, if the read clock waveform i generated by the remote logic circuit is as shown in FIG. 12, the tens digit up/down counter 410 counts one read clock pulse and then stops counting. Then, upon the occurrence of the first mark pulse shown in waveform c of FIG. 12, the JK flipflop 409 changes state and the NAND gate 407 connected to the Q output of the JK flipflop 409 is actuated by virtue of the coincidence of the read clock pulse shown as waveform h in FIG. 12 and the Q output of the JK flipflop 409. The output of the NAND gate 407 is supplied to the units digit up/down counter 411 which begins up counting from 0 in response to the read clock pulses provided by the NAND gate 407. These read clock pulses are shown as waveform j in FIG. 12.

Again, the units digit up/down counter 411 is preferably a type SN74192 integrated circuit although other counters may be used. According to the example waveform j in FIG. 12, the units digit up/down counter 411 counts one read clock pulse and then stops counting. Thus, the remote station address designated by the central station according to this example is 11. Of course, many different addresses may be employed in the present invention without departing from the scope of this invention. These different addresses result in a different arrangement of the read clock pulses of waveforms h-j of FIG. 12.

The occurrence of the second mark pulse in the waveform c of FIG. 12 returns JK flipflop 409 to its original state. In addition, the coincidence condition for the NAND gate 412 which is connected to JK flipflop 409 is met upon the occurrence of this second mark pulse. The NAND gate 412 is connected to an inverter 413 which is connected to the NOR gate 414. The NOR gate 414 supplies a reset or clear pulse to the JK flipflop 404 upon the occurrence of the second mark pulse. As a result, the JK flipflop 404 is reset and no further count clock pulses of waveform d are passed by the NAND gate 405 connected to the Q output of the JK flipflop 404. This terminates the process of identifying the transmitted address and the next step is to determine whether the transmitted address is the same as the preselected address of the remote station.

The address comparator circuit for the remote station logic circuit shown in FIG. 11A is controlled by the binary outputs of the up/down counters 410 and 411. A first series of inverters 415-422 are directly connected to each of the four binary outputs of each of the up/down counters 410 and 411. A second series of inverters 423-430 are connected to a plurality of independent manual switches 431-438. These switches 431-438 connect each one of the inverters 423-430 to either one of the binary outputs of each of the up/down counters 410 and 411 or to the output of one of the inverters 415-422. The switches 431-438 can be positioned in a preselected manner to indicate the preselected address of the particular remote station shown in FIG. 11A. The output of the inverters 423-430 are connected together at a common point which is connected to NAND gate 439. This NAND gate 439 has a second input connected to the output of the inverter 413. This second input is supplied to the NAND gate 439 after the occurrence of the second mark pulse of waveform c of FIG. 12. The signal supplied by NAND gate 412 and inverter 413 to the NAND gate 439 to indicate that the address sent by the central station has been entered into the tens digit up/down counter 410 and the units digit up/down counter 411. If the common point connecting the inverters 423-430 to NAND gate 439 is at the binary 1 level, a match occurs between the designated address sent by the central station and the preselected address of the remote station shown in FIG. 11A. For example, with the switches 431-438 positioned as shown in FIG. 11A, the match pulse produced at the common point connecting the outputs of inverters 423-430 to the NAND gate 439 is as shown in waveform k of FIG. 12. The occurrence of this match pulse at NAND gate 439 generates a clock signal at the clock input of the JK flipflop 440 which is connected to the output NAND gate 439. On the other hand, if the designated address sent by the central station is anything other than the preselected address of the remote station shown in FIG. 11A, that is, the address 11, the address comparator circuit of the remote station shown in FIG. 11A would not produce a match pulse and the clock input of JK flipflop 440 would not be energized. The switches 431-438 can be set in any combination of positions but the address selected must match the address request of the central station before the remote station responds. According to the present invention, only one of the remote stations has a preselected address which matches the designated address sent by the central station and only that one station is capable of responding to the request signal sent by the central station.

Assuming the proper matching pulse occurs in waveform k of FIG. 12, the coincidence condition for the NAND gate 439 is fulfilled and the clock input of the JK flipflop 440 is energized by the output of NAND gate 439. As a result, the Q output of the JK flipflop 440 changes state as shown by the waveform l in FIG. 12. The Q output of JK flipflop 440, which is connected to the oscillator of the RF transmitter of the remote station, energizes the oscillator of the RF transmitter after the acceptance by the remote station of the designated address sent by the central station. In addition, the Q output of the JK flipflop 440 is connected to one input of each of the NAND gates 441 and 442. The output of the NAND gate 441 is connected to the up count input of sequencer 443 which generates a binary coded output corresponding to the number of input pulses. The sequence 443 is a conventional circuit such as a type SN74192 integrated circuit although other sequences may be used in the circuit of the present invention. The four binary outputs of the sequencer 443 are connected to the BCD-digital converter 444 which actuates a plurality of outputs in sequence in accordance with the binary coded numbers provided by the sequencer 443. The BCD-digital converter 444 is a conventional circuit such as type SN7442A although other circuits may be used in the present invention. Each of the seven outputs of the BCD-digital converter 444 is connected to one of the inverters 445-451. The outputs of these inverters 445-451 are connected to a plurality of up/down counters 410, 411 and 454-458 located in the remote station which provide digital information for transmission to the central station. The outputs 1-5 of inverters 445-449 are shown as waveforms m-q in FIG. 12. The outputs 6-7 of the BCD-digital converter 444 are not shown in FIG. 12 but are evident from waveforms m-q. The first output waveform of BCD-digital converter 444 (waveform m) is normally high and is supplied to one of the inputs of NAND gate 452 which has an output connected to the down counter input of the up/down counter 410. The other input of the NAND gate 452 is connected to the output of the NAND gate 442 which supplies the count clock pulse generator described above to the NAND gates 452, 453 and 459-463 connected to each of the down counter inputs of the up/down counters located in FIG. 11A. Since the up/down counter 410 still retains the designated address sent by the central station, the count clock pulse supplied by NAND gate 442 to NAND gate 452 enables the up/down counter 410 to down count from the numeric value of the designated address to zero. Upon reaching zero, the up/down counter 410 energizes output A shown in FIG. 11A which is connected to the remote station digital encoder of FIG. 11B. The remote station digital encoder shown in FIG. 11B generates the trigger signal shown as waveform y in FIG. 12 which enables the sequencer 443 through NAND gate 441 to actuate the second output of the digital converter 444. The second output of the digital converter 444 is connected to the NAND gate 453 through inverter 446. The output of NAND gate 453 is connected to the down counter input of the up/down counter 411. The up/down counter 411 also retains the designated address sent by the central station. This up/down counter 411 counts down from the numeric values of the designated address stored therein to zero in the same manner as the up/down counter 410. Upon reaching zero, the up/down counter 411 energizes output B which is connected to the remote station digital encoder shown in FIG. 11B.

Figure 11B:
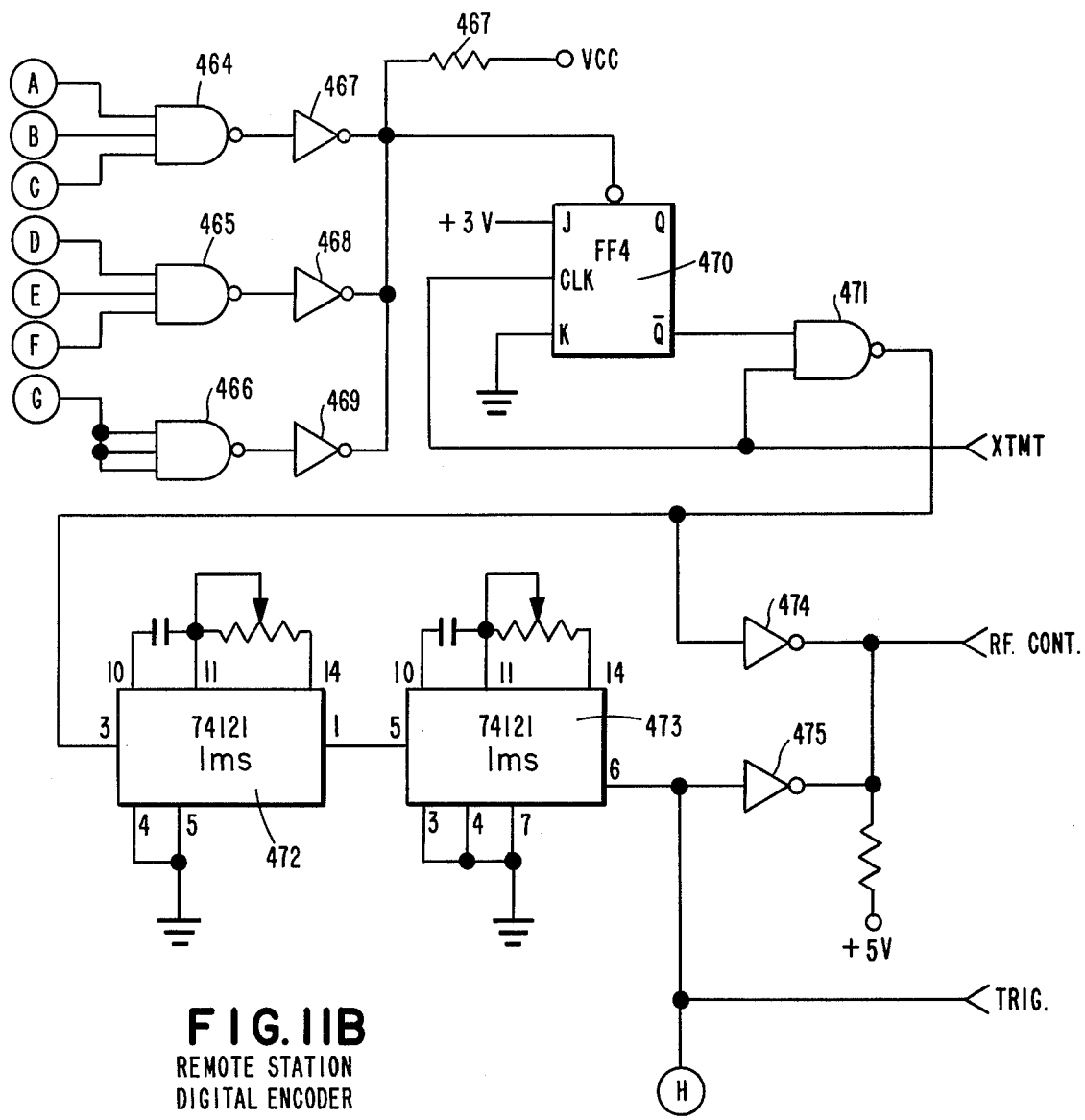
FIG. 11B is a circuit diagram of the digital encoder of the remote station shown in FIG. 3.
Figure 12:
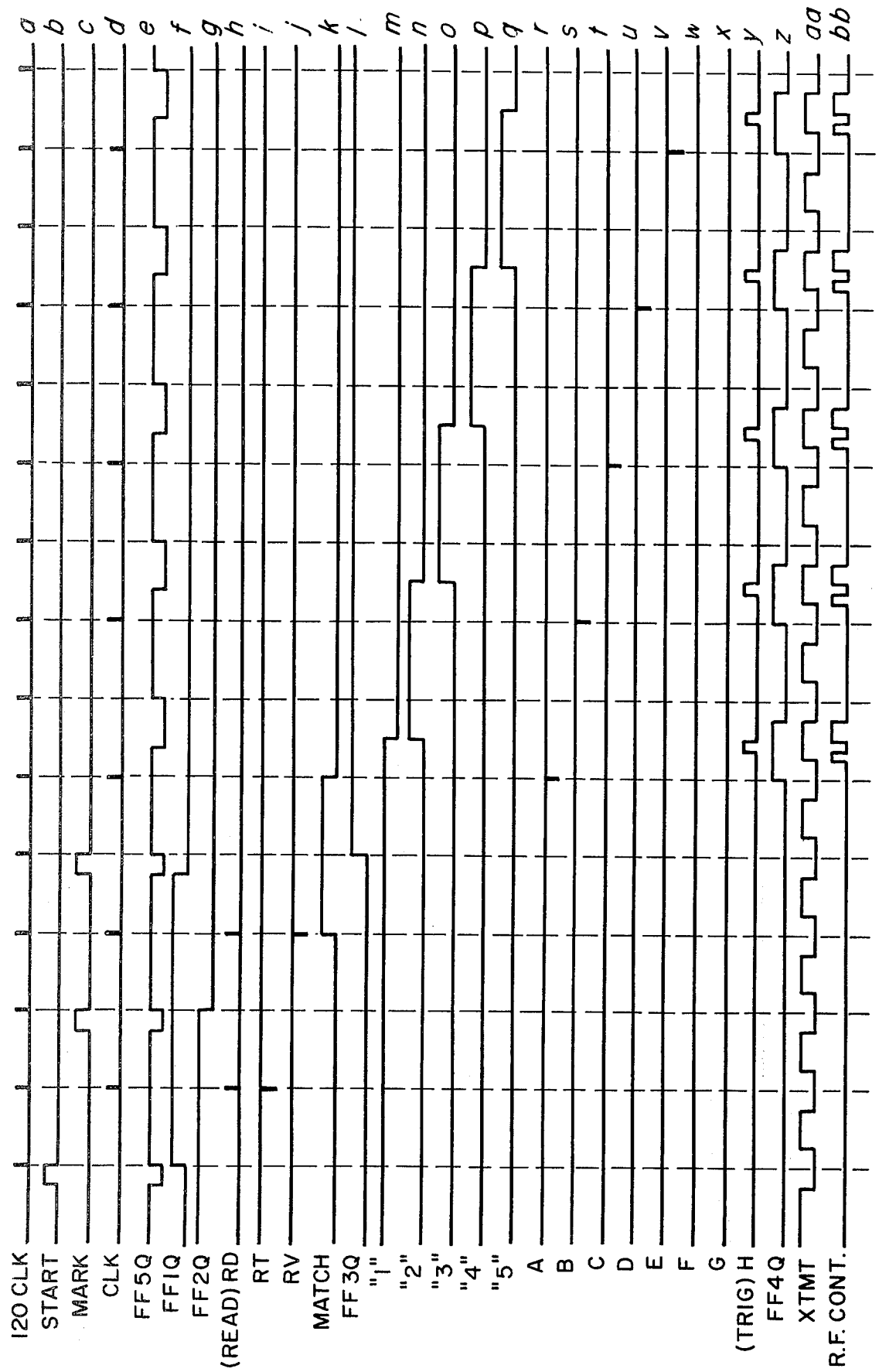
FIG. 12 is a timing diagram for the circuit shown in FIGS. 11A and 11B.

The up/down counters 410 and 411 provide output signals to the remote station digital encoder shown in FIG. 11B which represent the address stored in these counters. The address stored in these counters was previously supplied by the central station during the processing of the data processing of the data input signal. As an alternative to using the same counters to receive the designated address from the central station and then later to transmit the address of the remote station, different counters can be used for these two functions. For example, the address signals sent by the remote station to the central station in response to a data input request could be supplied by an address preload circuit to separate address down counters in the remote station. In this manner, the dual function of the up/down counters 410 and 411 can be eliminated without departing from the scope of this invention. In such a case, the outputs signals of the BCD-digital converter 444 connected to inverters 445 and 446 are converted to separate down counters having an address preloaded therein by an address preload circuit. Many different modifications of the address code logic circuit can be employed in the circuit shown in FIG. 11A without departing from the scope of the present invention.

In addition to the counters 410 and 411 which supply address signals for transmission by the remote station to the central station, digit down counters 454-458 are connected to the outputs of the BCD-digital converter 444 through their respective NAND gates 459-463. These down counters 454-458 are energized in sequence by the BCD-digital converter 444. The NAND gates 459-463 each have a second input connected to the output of NAND gate 442 which supplies the count clock pulse to the down count inputs of each of these down counters 454-458. Although the down counters 454-458 employed in FIG. 11A are preferably type SN74192 integrated circuits, other down counters may be used. The digital information stored in these down counters 454-458 in the preferred embodiment is supplied by an encoder which is shown in block diagram form in FIG. 3. Because the details of the encoder employed in the present invention are not part of the present invention, these encoders are not described in detail herein. The encoder used in the present invention is a conventional commercially available encoder which is capable of operation with the watt-hour meters of the preferred embodiment. Digital information contained in the watt-hour meter is picked up or sensed by the encoder. The encoder then supplies this digital information to each of the down counters 454-458 over the down counter inputs shown in FIG. 11A. These inputs are each respectively biased by a biasing circuit comprising a plurality of biasing resistors also shown in FIG. 11A. An example of the type of conventional encoder which may be used in the preferred embodiment of the present invention is a L.E.D. encoder. Of course, other types of encoders as well as other types of digital information input devices other than a watt-hour meter may also be used without departing from the scope of the present invention.

Each of the down counters 454-458 which are sequentially actuated by the converter 444, down count from the numeric values stored therein to zero. Upon reaching zero, each of these down counters 454-458 supplies a signal to the remote station digital encoder shown in FIG. 11B. Down counter 454 provides a signal shown as waveform $t$ in FIG. 12; down counter 455 provides a signal shown as waveform $u$ in FIG. 12; down counter 456 provides a signal shown as waveform $v$ in FIG. 12, down counter 457 provides a signal shown as waveform $w$ in FIG. 12; and down counter 458 provides a signal shown as waveform $x$ in FIG. 12. In addition, as described previously, the address up/down counters 410 and 411 provide a signal shown as waveforms $r$ and $s$ in FIG. 12, respectively.

The remote station digital encoder of FIG. 3 is shown in greater detail in the circuit diagram in FIG. 11B. This same circuit arrangement is also used for the central station encoder shown in FIG. 2. In the remote station, each of the outputs of the digital counters 410, 411 and 454-458 described above is connected to one of the NAND gates 464-466 and inverters 467-469 of the digital encoder. The outputs of these inverters 467-569 are connected to the reset input of the JK flipflop 470. Each of the outputs of the digital counters 410, 411 and 454-458 cause the Q complement output of the JK flipflop 470 to change state as shown by waveform $z$ in FIG. 12. The JK flipflop 470 is reset by one of the XTMT pulses of the XTMT pulse signal shown as waveform $aa$ in FIG. 12 after each of the outputs of the digital counters 410, 411 and 454-458 enables the JK flipflop to change state. The reset input of JK flipflop 470 enables the JK flipflop to return to its original state. The Q complement output of the JK flipflop 470 is connected to one input of the NAND gate 471. The other input of the NAND gate 471 is connected to receive the signal which is used to generate the response of the remote station. Thus, as each of the outputs of the digital counters 410, 411 and 454-458 triggers the JK flipflop 470, the XTMT pulse shown as waveform $aa$ acts as a reference or timing signal which, in combination with the Q complement signal output of JK flipflop 470, enables the remote station to send the digital information contained in these counters to the central station.

This XTMT pulse signal is generated by the power supply and timing source shown in FIG. 8 which is connected with the central station power supply and timing source shown in FIG. 4 over the power lines of the power distribution system.

The output of the NAND gate 471 is first supplied to the series connected monostable multivibrators 472 and 473 which generate the trigger waveform $y$ shown in FIG. 12. The trigger waveform 7 performs several functions as shown in FIGS. 11A and 11B. This trigger waveform is used to reset the JK flipflop 400 through NOR gate 401 in order to prevent the occurrence of a 120 clock pulse in the count clock pulse of waveform $d$ in FIG. 12 immediately after one of the outputs (waveforms $r$–$x$ of FIG. 12) of counters 410, 411 and 454-458 is energized. This gives the circuit shown in FIG. 11A adequate time to prepare for the actuation of the next counter of down counters 410, 411 and 454-458. This waveform $y$ is also used to fulfill the coincidence condition of the NAND gate 441 in FIG. 11A which is connected to the sequencer 443 and it is used in combination with the output signal of the NAND gate 471 in FIG. 11B to produce the marking output signal shown as waveform $bb$ in FIG. 12 which is transmitted by the remote station to the central station. The output of the NAND gate 471 is inverted by inverter 474 and the output of the monostable multivibrator 473 is inverted by inverter 475. The outputs of inverters 474 and 475 are connected together which results in the addition of the output waveforms of these inverters 474 and 475. The resulting waveform which is shown as waveform $bb$ in FIG. 12 is the marking output pulse signal of the remote station. As shown by waveform $bb$ in FIG. 12, each of the marking pulses of the data output pulse signal is pulse coded for identification by the central station. It should be noted that the waveforms shown in FIG. 12 indicate the response of a remote station with the address 11. The first three digits of the digital information in counters 454-458 as shown in FIG. 12 are all ones. Of course, different digital information in the counters 454-458 and a different address for the remote station of FIGS. 11A and 11B will change the waveforms in FIG. 12 accordingly.

The operation of the remote station logic circuit and the remote station digital encoder has been described in connection with the description of the circuit elements of FIGS. 11A and 11B and the timing diagram of FIG. 12. In summary, the circuit arrangement provided in the remote stations of the present invention enables the remote stations to identify a designated address sent by the central station. If the designated address matches the preloaded address of the remote station, the remote station will respond to the central station by sending digital information such as a watt-hour meter reading together with the remote station address. This digital information is transmitted to the central station by the combined effect of the marking pulse signal shown as waveform $bb$ in FIG. 12, the XTMT waveform shown as waveform $aa$ and the 120 clock pulse. The central station receives the marking pulse signal from the remote station, identifies it is a manner similar to that performed by the digital decoder of the remote station shown in FIG. 9 and uses the marking pulse signal together with the reference signals transmitted over the power lines of the power distribution system in order to derive the digital information transmitted by the remote station.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention. For example, it is to be understood that the invention is not limited to the automatic reading of watt-hour meters at remote locations in a power distribution system. The communication system of the present invention can be used whenever it is desired to transmit digital information from one station to another.

I claim:

1. A communication system having at least two stations for communicating digital information between said stations comprising:

a signal source coupled to all said stations;

reference means connected to said signal source in each of said stations for generating the same time reference signal in each of said stations;

signal generating means in each of said stations for generating a marking signal having a relationship to the time reference signal which is determined by the digital information to be transmitted, wherein the marking signal by itself does not contain the digital information but rather the relationship between the marking signal and the time reference signal identifies the digital information;

signalling means for communicating the marking signal from station to station; and signal evaluating means in each of said stations for evaluating the relationship between the marking signal communicated from another one of said stations and the time reference signal generated in said station to determine the digital information transmitted from said another one of said stations.

2. The communication system according to claim 1 wherein said signal source comprises electrical power lines connected between said stations.

3. The communication system according to claim 2 wherein the marking signal communicated by said signalling means is communicated by radio waves.

4. The communication system according to claim 2 wherein the reference signal is generated from the power signal transmitted over said electrical power lines.

5. The communication system according to claim 1 wherein the time reference signal generated by said reference means in each of said stations is a clock pulse.

6. The communication system according to claim 5 wherein the marking signal generated by said signal generating means in each of said stations is a pulse signal which identifies the number of clock pulses in the time reference signal corresponding to the digital information to be transmitted.

7. The communication system according to claim 6 wherein the signal evaluating means in each of said stations reproduces the marking signal communicated from another station and uses the marking signal to identify the number of clock pulses in the time reference signal corresponding to the digital information transmitted from said another one of said stations.

8. The communication system according to claim 1 wherein said signal generating means comprises down counter means for temporarily storing the digital information and logic control means connected to said down counter means for enabling said down counter means to down count to zero in synchronization with the time reference signal to thereby generate a marking signal which identifies the starting and stopping of the down count of said down counter means.

9. The communication system according to claim 8 wherein said signal evaluating means comprises up counter means and logic control means connected to said up counter means and responsive to the starting and stopping identifiers in the marking signal transmitted from another one of said stations for enabling said up counter means to up count from zero in synchronization with the time reference signal to thereby temporarily store the same digital information in said up counter means as temporarily stored in the down counter means in said another one of said stations.

10. A bidirectional communication system for transmitting digital information between a central station and at least one remote station connected to each other over electrical power lines, said electrical power lines being capable of transferring a power signal between said stations, said communication system comprising:

reference means located in each of said remote stations and said central station for deriving the same reference signal from the power signal on said electrical power lines;

remote signalling means located in each of said remote stations including generating means for generating a marking signal having a relationship to the time reference signal in said remote station which is determined by the digital information to be transmitted from said remote station to said central station, said remote signalling means further including transmitting means for transmitting the marking signal to said central station over a transmission medium other than said electrical power lines;

central signalling means located in said central station including receiving means for receiving the marking signal and evaluating means for evaluating the relationship between the marking signal and the time reference signal to determine the digital information conveyed from each of said remote stations to said central station.

11. The communications system according to claim 10 wherein said other transmission medium comprises radio waves.

12. The communication system according to claim 10 wherein said power signal is a 60 hz power signal.

13. The communication system according to claim 10 wherein the marking signal includes address portions which determine the address of the remote station transmitting the marking signal.

14. The communication system according to claim 10 wherein said central signalling means further includes generating means for generating a marking signal having a relationship to the time reference signal in said central station which is determined by the digital information to be transmitted from said central station to said remote station, said central signalling means further including transmitting means for transmitting the marking signal to at least one of said remote stations over a transmission medium other than said electrical power lines; and wherein said remote signalling means further includes receiving means for receiving the marking signal and evaluating means for evaluating the relationship between the marking signal and the time reference signal to determine the digital information conveyed from said central station to said at least one of said remote stations.

15. The communication system according to claim 14 wherein the marking signal transmitted by said central signalling means contains address portions for identifying a particular one of said remote stations, the remote signalling means in said particular remote station being the only one of said remote stations capable of responding to the address portions.

16. The communication system according to claim 15 wherein the marking signal transmitted by said central signalling means further contains a request portion, said remote signalling means in said particular remote station, upon identifying the address portions, being responsive to the request portion to generate and transmit a marking signal to said central station.

17. The communication system according to claim 16 wherein the marking signal transmitted by said remote signalling means in each of said remote stations contains an address portion identifying the particular one of said remote stations, said central signalling means in said central station being capable of identifying the address portions.

18. The communication system according to claim 17 wherein the marking signal transmitted by said particular one of said remote stations further contains a data portion, said central signalling means in said central station, upon identifying said particular remote station, being capable of storing the data portion associated with said particular remote station.

19. The communication system according to claim 18 wherein the data portions represent watt-hour meter readings at each of said remote stations.

20. The communication system according to claim 18 wherein said central signalling means further comprises comparing means for comparing the address portion transmitted by said remote stations, said comparing means enabling said central signalling means to store the data portion of the marking signal when the address portions match.

21. The communication system according to claim 10 wherein said reference means located in each of said remote stations and said central station synchronizes the operation of said remote signalling means and said central signalling means with respect to the reference signals.

22. The communication according to claim 10 wherein said remote signalling means further comprises coding means connected to said transmitting means in said remote station for coding the marking signal with a preselected code and said central signalling means further comprises decoding means connected to said receiving means in said central station for decoding the preselected code to thereby ensure signal security.

23. The communication system according to claim 22 wherein said preselected code is a pulse code.

24. The communication system according to claim 23 wherein said preselected code further includes a preselected relationship between the marking signal and a second time reference signal derived from the power signal on said electrical power lines.

25. A communication system for transferring digital information from at least one remote station to a central station, said communication system comprising:
a signal source coupled to said remote and central stations;
reference means connected to said signal source in said remote and central stations for generating the same time reference pulse signal in said remote and central stations from the signal provided by said signal source;
counter means located in each of said remote and central stations for storing digital information by counting the pulses in the time reference pulse signal;
signal transmitting means connected to said counter means in each of said remote stations for transmitting marking signals to said central station indicating the starting and stopping of said counter means in each of said remote stations;
signal receiving means connected to said counter means in said central station for receiving the marking signals and supplying the marking signals to said counter means in said central station to start and stop said counter means in said central station in synchronization with the starting and stopping of said counter means in said remote station to thereby transfer
digital information from said counter means in at least one remote station to said counter means in said central station.

26. The communication system according to claim 25 wherein said counter means in said remote station comprises a plurality of down counters and said counter means in said central station comprises a plurality of up counters.

27. The communication system according to claim 26 wherein a portion of said plurality of down counters in said remote station and a like portion of said plurality of up counters in said central station contain the address of said remote station.

28. The communication system according to claim 25 wherein the digital information transmitted by said remote station to said central station includes the address of said remote station.

29. A communication system for transferring digital information from a central station to at least one remote station and vice versa, said communication system comprising:
a signal source coupled to said remote and central stations;
reference means connected to said signal source in said remote and central stations for generating the same time reference pulse signal in said remote and central stations from the signal provided by said signal source;
counter means located in each of said remote and central stations for storing digital information by counting the pulses in the time reference pulse signal;
selection means located in said central station for selecting a particular one of said remote stations for operation according to a preassigned address and storing the selected address in said counter means in said central station;
signal transmitting means connected to said counter means in said central station for transmitting marking signals to said remote station indicating the starting and stopping of said counter means in said central station;
signal receiving means connected to said counter means in said particular one of said remote stations for receiving the marking signals and supplying the marking signals to said counter means in said particular one of said remote stations to start and stop said counter means in synchronization with the starting and stopping of said counter means in said central station to thereby transfer the selected address from said counter means in said central station to said counter means in said remote station;
comparing means located in each of said remote stations for comparing the selected address in said counter means in said remote station with the preassigned address of said remote station, said comparing means being responsive to a match between the preassigned address and the selected address to enable said remote station to transmit digital information to said central station.

30. The communication system according to claim 29 wherein said counter means in said central station comprises a plurality of down counters and said counter means in each of said remote stations comprises a plurality of up counters.

31. The communication system according to claim 30 wherein said timing reference signal is a clock pulse signal for stepping said plurality of down counters in said central station and said plurality of up counters in said remote stations through their respective counting positions.

32. A communication system for transmitting digital information from a remote station to a central station comprising:
- a signal source coupled to said remote and central stations;
- reference means connected to said signal source in said remote and central stations for generating the same time reference pulse signal in said remote and central stations from the signal provided by said signal source;
- down counter means located in said remote station for storing said digital information;
- up counter means located in said central station for receiving said digital information transmitted from said remote station;
- start means connected to said down counter means for generating a start signal in said remote station for enabling said down counter means to count down to zero by counting the pulses in the time reference pulse signal, said down counter means generating a stop signal when said down counter means reaches zero;
- transmitting means located in said remote station for transmitting said start and stop signals to said up counter means in said central station, said up counter means being enabled by said start and stop signals to up count by counting the pulses in the time reference pulse signal to thereby store the same digital information previously stored in said down counter means in said remote station.

33. A communication system according to claim 32 wherein said signal source is formed by the 60 hz power lines connected between said stations, the time reference pulse signal being derived from the 60 hz power signal transmitted over said power lines.

34. A communication system according to claim 32 wherein said start and stop signals are transmitted to said up counter means in said central station by radio waves.

35. A communication system according to claim 32 wherein said down counter means comprises a plurality of interconnected down counters and said up counter means comprises a plurality of interconnected up counters, said plurality of down counters being enabled in sequential order by said start means, each of said down counters generating a stop signal when said down counter reaches zero, each of said plurality of up counters being enabled in a similar sequential order by said start and stop signals to thereby transmit digital information stored in said plurality of down counters to said plurality of up counters.

36. A communication system according to claim 35 wherein said reference means synchronizes the operation of said plurality of down counters and said plurality of up counters to thereby enable corresponding ones of said plurality of down counters and said plurality of up counters to start and stop within the same relative interval of time.

37. A communication system according to claim 35 wherein at least one of said plurality of down counters and a corresponding number of said plurality of up counters contain the address of said remote station.

38. A bidirectional digital communication system for a power distribution system having a central station and a plurality of remote stations, said communication system comprising:
- a signal source formed by the 60 Hz power lines of the power distribution system coupled to said central and remote stations;
- reference means connected to said signal source in each of said stations for generating the same time reference pulse signal in each of said stations;
- request means in said central station for generating a request signal indicative of the selected address of a particular remote station, said request means including address down counter means for storing the selected address of said particular remote station and logic means for actuating said down counter means in synchronization with the time reference pulse signal to thereby generate a marking signal which identifies the starting and stopping of said down counter means;
- transmitting means in said central station for transmitting the marking signal to said remote stations by radio waves;
- receiving means in each of said remote stations for receiving the marking signal transmitted by said central station; and
- address comparison means in each of said remote stations for comparing the selected address with the preassigned address of said remote station and generating a match signal when the selected address matches the preassigned address of said remote station, said address comparison means including address up counter means and logic means for actuating said address up counter means in synchronization with the time reference pulse signal, said logic means being responsive to the marking signal to start and stop said address up counter means in the same time interval as said address down counter means in said central station to thereby transmit the address stored in said address down counter means in said central station to said address up counter means in said remote station, said address comparison means further including a comparator means controlled by said logic means for comparing the address stored in said address up counter means to the preassigned address of said remote station.

39. A bidirectional communication system according to claim 38 further comprising:
- reply means in each of said remote stations connected to said address comparison means for generating a marking signal indicative of the digital information stored in said remote station in response to a match signal generated in said remote station by said address comparison means, said reply means including information down counter means for storing digital information including the address of said remote station and logic means for actuating said information down counter means in synchronization with the time reference pulse signal to thereby generate a marking signal which identifies the starting and stopping of said information down counter means;
- transmitting means in each of said remote stations for transmitting the marking signal to said central station by radio waves;

receiving means in said central station for receiving the marking signal transmitted by said remote stations;

response means in said central station connected to said receiving means for identifying and displaying the digital information including the address transmitted by one of said remote stations, said response means including information up counter means and response logic means for actuating said information up counter means in synchronization with the time reference pulse signal, said response logic means being responsive to the marking signal to start and stop said information up counter means in the same time interval as said information down counter means in said one remote station to thereby transmit the digital information stored in said information down counter means in said one remote station to said information up counter means in said central station, said response means further including output means connected to said information up counter means for displaying the transmitted digital information.

40. A method for transmitting digital information from at least one remote station to a central station and vice versa, said remote station including first counter means for storing said digital information and said central station including second counter means, said method comprising the steps of:

generating the same time reference signal in said remote and central stations;

synchronizing the operation of said first and second counter means by using the same time reference signal in said first and second counter means as a counting input;

starting the counting of said first counter means in said remote station;

transmitting a first marking signal from said remote station to said central station to indicate the initiation of counting in said first counter means;

applying said first marking signal to said second counter means in said central station to initiate the counting in said second counter means;

stopping the counting of said first counter means in said remote station;

transmitting a second marking signal from said remote station to said central station to indicate the termination of counting in said first counter means;

applying said second marking signal to said second counter means in said central station to terminate the counting in said second counter means to thereby transmit digital information stored in said first counter means to said second counter means.

41. The method of claim 40 wherein the timing reference signal is supplied to said remote and central stations over electrical power lines connected between said stations.

42. The method of claim 41 wherein the 60 Hz power signal provided over said electrical power lines is used to derive the timing reference.

43. The method according to claim 42 wherein said first and second marking signals are transmitted from said remote station to said central station by radio waves.

44. The method according to claim 40 wherein said first counter means comprises a plurality of down counters and said second counter means comprises a plurality of up counters, said method comprising the further staps of:

sequentially starting and stopping said plurality of down counters in said remote station;

transmitting a plurality of marking signals including a plurality of said first marking signals and a plurality of said second marking signals from said remote station to said central station to sequentially start and stop corresponding ones of said plurality of up counters in said central station to thereby transmit digital information stored in said plurality of down counters in said remote station to said plurality of up counters in said central station.

45. The method according to claim 44 wherein the operation of said plurality of down counters and said plurality of up counters is synchronized by the same timing reference supplied to both said remote and central stations over electrical power lines connected between said stations.

46. The method according to claim 45 wherein said marking signals are represented by pulses in a pulse signal
and said signal is transmitted from said remote station to said central station by radio waves.

47. The method according to claim 46 wherein the timing reference signal is a pulse signal and each of the pulses in said pulse signal transmitted by said remote station is provided with identification characteristics including a specific duration and coincidence with one of the pulses of the timing reference signal.

48. The method according to claim 47 wherein each of the pulses in said pulse signal transmitted by said remote station is divided into a plurality of internal pulses of specific duration.

49. The method according to claim 48 wherein each of the pulses in said pulse signal is divided into four parts representing a given binary number.

50. The method according to claim 48 further comprising the step of:
verifying the identification characteristics of each of the pulses in said pulse signal in said central station prior to acceptance of said pulse signal.

51. The method according to claim 40 further comprising the step of:
sending a request signal from said central station to said remote station for requesting said remote station to transmit digital information.

52. A method according to claim 51 wherein said request signal comprises a plurality of pulses sent by radio waves including a given number of start pulses and at least one address pulse for identifying a particular one of said remote stations,
wherein the timing reference signal is a pulse signal and
each of the pulses in said request signal sent by said central station is provided with identification characteristics including a definite duration and coincidence with one of the pulses of the timing reference signal, the method further comprising the step of:
verifying the identification characteristics of each of the pulses in said request signal and the given number of start pulses in said request signal in said remote station prior to acceptance of said request signal.

53. The method according to claim 32 wherein each of the pulses of said request signal transmitted by said central station is divided into a plurality of internal pulses of specific duration representing a given binary number, the method further comprising the step of:

verifying the division of each of the pulses of said request signal in said remote station prior to acceptance of said request signal.

54. The method according to claim 40 further comprising the step of:

sending a request signal containing the address of a particular remote station from said central station to said particular remote station for requesting said particular remote station to transmit digital information;

comparing in said remote station the address contained in said request signal to an address stored in said particular remote station and generating a match signal when said addresses are identical;

transmitting digital information from said particular remote station to said central station in response to said match signal.

55. The method according to claim 54 wherein the digital information transmitted by said particular remote station contains an address stored in said remote station, the method further comprising the step of:

comparing in said central station the address contained in the transmitted digital information to the address contained in said request signal and generating a central match signal in said central station when said addresses are identical, said central station accepting the transmitted digital information in response to said central match signal.

56. A method for transmitting digital information from a remote station to a central station and vice versa comprising the steps of:

generating the same time reference pulse signal in said remote and central stations;

storing digital information in down counter means located in said remote station;

clearing an up counter means located in said central station in preparation for receipt of the digital information;

synchronizing the operation of said down counter means and said up counter means by using the time reference pulse signal as a counting input for both said down counter means and said up counter means;

generating a start signal in said remote station for starting said down counter means in said remote station;

transmitting the start signal to said central station to start said up counter means in said central station;

generating a stop signal in said remote station when said down counter means reaches zero;

transmitting the stop signal to said central station for stopping said up counter means in said central station to thereby transmit digital information from said down counter means in said remote station to said up counter means in said central station by starting and stopping both said counter means within the same relative time interval.

57. A method according to claim 56 wherein the start and stop signals are transmitted from said remote station to said central station by radio waves.

58. A method according to claim 57 wherein the time reference pulse signal is derived from the 60 hz electrical power lines connected between said stations.

59. A method according to claim 58 wherein said down counter means comprises a plurality of down counters and said up counter means comprises a like plurality of up counters, said method further comprising the step of:

starting and stopping said plurality of down counters and said plurality of up counters in a similar sequential order to thereby transmit digital information stored in said plurality of down counters to said plurality of up counters by transmitting a plurality of start and stop signals from said remote station to said central station.

60. A method according to claim 59 wherein said digital information includes an address portion.

61. A method according to claim 57 wherein said method further comprises the step of:

sending a request signal from said central station to said remote station for requesting said remote station to transmit said digital information stored in said down counter means, said request signal being a radio wave signal.

62. A method according to claim 61 wherein both said request signal and said digital information include an address portion, said remote station being one of a plurality of remote stations identified by said address portion.

* * * * *